US012572526B2

(12) United States Patent
Heidarikhazaei et al.

(10) Patent No.: US 12,572,526 B2
(45) Date of Patent: Mar. 10, 2026

(54) SYSTEMS, APPARATUSES, METHODS, AND NON- TRANSITORY COMPUTER-READABLE STORAGE MEDIA FOR DETECTING DATA INTEGRITY ISSUE IN HETEROGENEOUS CLUSTER ENVIRONMENTS WITH CACHE OPTIMALITY

(71) Applicant: HUAWEI CLOUD COMPUTING TECHNOLOGIES CO., LTD., Guizhou (CN)

(72) Inventors: Alireza Heidarikhazaei, Vancouver (CA); Amirhossein Ahmadi, Vancouver (CA); Zefeng Zhi, Vancouver (CA); Wei Zhang, Vancouver (CA)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 18/769,665

(22) Filed: Jul. 11, 2024

(65) Prior Publication Data

US 2026/0017245 A1      Jan. 15, 2026

(51) Int. Cl.
*G06F 16/00*          (2019.01)
*G06F 16/23*          (2019.01)
(52) U.S. Cl.
CPC ................................ *G06F 16/2365* (2019.01)
(58) Field of Classification Search
CPC .............................. G06F 16/2365; G06F 16/23
See application file for complete search history.

(56) References Cited

U.S. PATENT DOCUMENTS

| 7,415,653 | B1 | 8/2008 | Bonwick et al. |
| 7,526,622 | B1 | 4/2009 | Bonwick et al. |
| 2018/0329967 | A1 * | 11/2018 | Lee .......................... G06F 16/27 |
| 2024/0086367 | A1 * | 3/2024 | Christner .............. G06F 16/164 |

FOREIGN PATENT DOCUMENTS

CN          106339270 A          1/2017

OTHER PUBLICATIONS

2011. LevelDB. https://opensource.googleblog.com/2011/07/leveldb-fastpersistent-key-value-store.html.
2023. Cloud Computing Market Size, Share Growth Report. https://www.grandviewresearch.com/industry-analysis/cloud-computing-industry.

(Continued)

*Primary Examiner* — Cheryl Lewis
(74) *Attorney, Agent, or Firm* — Tim Tingkang Xia, Esq.; Troutman Pepper Locke LLP

(57)          ABSTRACT

An apparatus has one or more processors functionally coupled to one or more computer-readable storage media for: receiving a first piece of data; storing the first piece of data and a corresponding first key into a key-value (KV) storage as a first KV block therein; generating a first metadata for at least the first piece of data; and storing a second key, the first metadata, and a first indication into the KV storage as a second KV block therein, the second KV block being associated with the first KV block. The first indication is for causing the first metadata of the second KB block to be unretrievable by another method.

20 Claims, 12 Drawing Sheets

(56)                    References Cited

OTHER PUBLICATIONS

2023. Global NoSQL Market Size, Share Trends Analysis Report by Type, by Application (Web Apps, Data Analytics, Mobile Apps, Data Storage, and Others), by End User (IT, Retail, Gaming, and Others) by Regional Outlook and Forecast. https://www.kbvresearch.com/nosql-market/.

Yehuda Afek, Dave Dice, and Adam Morrison. 2011. Cache index-aware memory allocation. ACM SIGPLAN Notices 46, 11 (2011), 55-64.

Brian F Cooper, Adam Silberstein, Erwin Tam, Raghu Ramakrishnan, and Russell Sears. 2010. Benchmarking cloud serving systems with YCSB. In Proceedings of the 1st ACM symposium on Cloud computing. 143-154.

Siying Dong, Andrew Kryczka, Yanqin Jin, and Michael Stumm. 2021. Evolution of Development Priorities in Key-value Stores Serving Large-scale Applications: The RocksDB Experience. In 19th USENIX Conference on File and Storage Technologies (FAST 21). USENIX Association, 33-49. https://www.usenix.org/conference/fast21/presentation/dong.

Siying Dong, Andrew Kryczka, Yangin Jin, and Michael Stumm. 2021. Rocksdb: Evolution of development priorities in a key-value store serving large-scale applications. ACM Transactions on Storage (TOS) 17, 4 (2021), 1-32.

Puya Ghazizadeh, Ravi Mukkamala, and Stephan Olariu. 2013. Data integrity evaluation in cloud database-as-a-service. In 2013 IEEE Ninth World Congress on Services. IEEE, 280-285.

Vishal Gour, SS Sarangdevot, Govind Singh Tanwar, and Anand Sharma. 2010. Improve performance of extract, transform and load (ETL) in data warehouse. Int. Journal on Comp. Sci. and Eng 2, 3 (2010), 786-789.

Alireza Heidari, Joshua McGrath, Ihab F Ilyas, and Theodoros Rekatsinas. 2019. Holodetect: Few-shot learning for error detection. In Proceedings of the 2019 International Conference on Management of Data. 829-846.

Mark Raasveldt and Hannes Mühleisen. 2019. Duckdb: an embed-dable analytical database. In Proceedings of the 2019 International Conference on Management of Data. 1981-1984.

Jiacheng Shen, Pengfei Zuo, Xuchuan Luo, Tianyi Yang, Yuxin Su, Yangfan Zhou, and Michael R. Lyu. 2023. Fusee: A Fully Memory-Disaggregated Key-Value Store. In 21st USENIX Conference on File and Storage Technologies (FAST 23). USENIX Association, Santa Clara, CA, 81-98. https://www.usenix.org/conference/fast23/presentation/shen.

Alexander Suleykin and Peter Panfilov. 2020. Metadata-driven industrial-grade ETL system. In 2020 IEEE International Conference on Big Data (Big Data). IEEE, 2433-2442.

Juncheng Yang, Yao Yue, and KV Rashmi. 2021. A large-scale analysis of hundreds of in-memory key-value cache clusters at twitter. ACM Transactions on Storage (TOS) 17, 3 (2021), 1-35.

Idan Yaniv and Dan Tsafrir. 2016. Hash, don't cache (the page table). ACM SIGMETRICS Performance Evaluation Review 44, 1 (2016), 337-350.

Qiaolin Yu, Chang Guo, Jay Zhuang, Viraj Thakkar, Jianguo Wang, and Zhichao Cao. 2024. Caas-Ism: Compaction-as-a-service for Ism-based key-value stores in storage disaggregated infrastructure. Proceedings of the ACM on Management of Data 2, 3 (2024), 1-28.

Jingyu Zhou, Meng Xu, Alexander Shraer, Bala Namasivayam, Alex Miller, Evan Tschannen, Steve Atherton, Andrew J Beamon, Rusty Sears, John Leach, et al. 2023. FoundationDB: A Distributed Key-Value Store. Commun. ACM 66, 6 (2023), 97-105.

Changyu Bi, Andrew Kryczka. Per Key-Value Checksum I RocksDB. 2. https://rocksdb.org/blog/2022/07/18/per-key-value-checksum.html.

Zhichao-cao. Full File Checksum and Checksum Handoff—facebook/rocksdb Wiki—GitHub. 3. https://github.com/facebook/rocksdb/wiki/Full-File-Checksum-and-Checksum-Handoff.

Alireza Heidari et al,"MetaHive: A Cache-Optimized Metadata Management for Heterogeneous Key-Value Stores",arXiv:2407.19090v1 [cs.DB] Jul. 26, 2024, total 7 pages.

International Search Report and Written Opinion for PCT/CN2025/108142,China National Intellectual Property Administration, China, Sep. 29, 2025.

* cited by examiner

102/104

164 — Application programs

172 — Logical memory

166 — Operating System (OS) — Network 108

168 — Logical I/O interface

170 — Device drivers

200

Key 1 (204-1)          Value 1 (206-1)

202-1 — Key 1 element 1 | Key 1 element 2 | ... | Value 1 element 1 | Value 1 element 2 | ...

214          214          216          216

Key 2 (204-2)          Value 2 (206-2)

202-2 — Key 2 element 1 | Key 2 element 2 | ... | Value 2 element 1 | Value 2 element 2 | ...

214          214          216          216

```
if KV_pair.checksum_flag == CHECKSUM_FLAG(KV_pair) and KV_pair.datatype== Tombstone:
    SKIP_DELETION(KV_pair);
else:
    PROCEED_WITH_DELETION(KV_pair);
```
FIG. 10
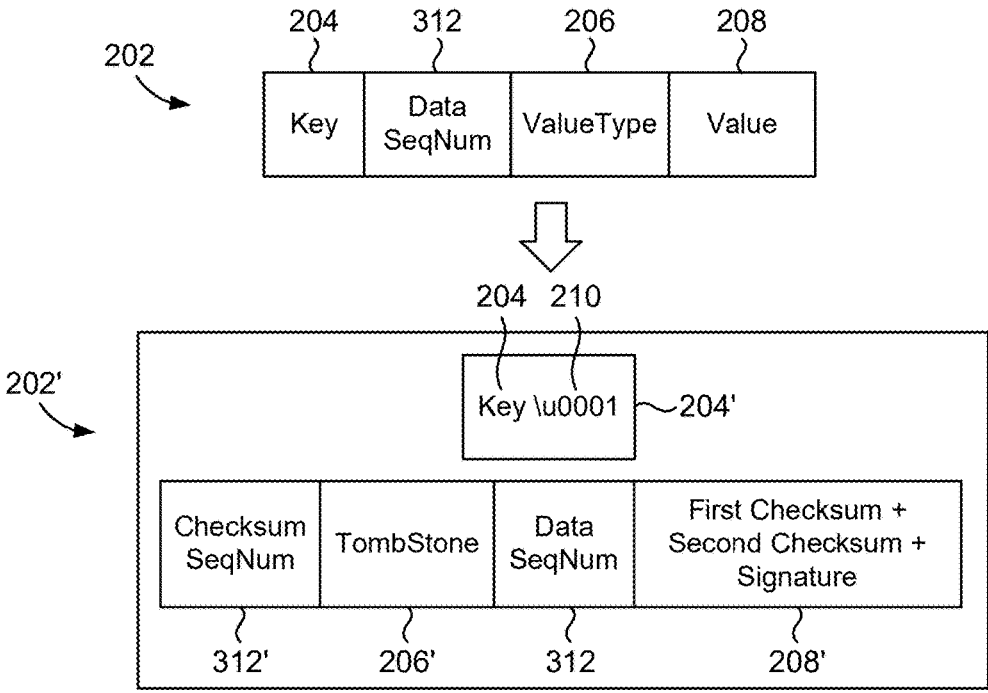
FIG. 11
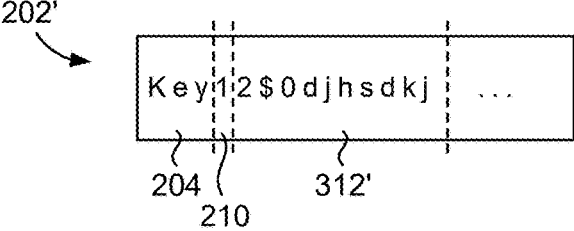
FIG. 12

SYSTEMS, APPARATUSES, METHODS, AND NON- TRANSITORY COMPUTER-READABLE STORAGE MEDIA FOR DETECTING DATA INTEGRITY ISSUE IN HETEROGENEOUS CLUSTER ENVIRONMENTS WITH CACHE OPTIMALITY

FIELD OF THE DISCLOSURE

The present disclosure relates generally to systems, apparatuses, methods, and computer-readable storage media for database application, and in particular to systems, apparatuses, methods, and computer-readable storage media for detecting data integrity issue in heterogeneous cluster environments with cache optimality.

BACKGROUND

A database is generally a data structure for storing data. A database system is often built on a data structure protected with an error detector. Errors can occur at different levels of the data with which they can be classified into two main levels, including the logical-level errors and the value-level errors. The logical-level errors are the errors that cannot be found by looking at the data alone. Rather, this type of errors are errors caused by the data that creates false information about the reality of the world. The solution to the problem of logical-level errors requires a high level of knowledge, which can be as large as the whole data or even some other resources. Machine learning (ML) can be very useful in finding logical-level errors and even addressing them.

On the other hand, value-level errors are errors in data values. For value-level problems, suitable algorithms may be used to create a unique value called checksum with respect to the data given when it first comes to the system; and store the unique value for future references in the validation phase.

At the validation stage, the same unique-value creation process may be used to create an encoding, then the stored checksum is called and compared with the encoding to make an exception in case of inconsistency. Many different checksum systems have been introduced such as cyclic redundancy check (CRC), XXHash (a fast hash algorithm), MurMurHash (a non-cryptographic hash function), and/or the like.

While various methods have been used for detecting data integrity issues, these methods usually have various drawbacks such as reduced system performance, increased checksum processing time, and/or the like.

SUMMARY

According to one aspect of this disclosure, there is provided a computerized method comprising: receiving a first piece of data; storing the first piece of data and a corresponding first key into a key-value (KV) storage as a first KV block (denoted a "data KV block"); generating a first metadata for at least the first piece of data; and storing a second key, the first metadata, and a first indication into the KV storage as a second KV block (denoted a "checksum KV block"), the second KV block being associated with the first KV block; wherein the first indication is for causing the first metadata of the second KV block to be unretrievable by another method.

In some embodiments, the KV storage is a KV database.

In some embodiments, the first metadata is a first checksum of at least the first piece of data.

In some embodiments, the second KV block further comprises a second checksum of the first checksum.

In some embodiments, the first metadata is a first checksum generated from a combination of the first key, the first piece of data, the unique number, and a value type of the first KV block.

In some embodiments, the first indication is a value type for indicating the another method to delete any KV block having this value type.

In some embodiments, the second key is generated from the first key marked by a second indication.

In some embodiments, the second indication is for causing the second key to be adjacent to the first key in a sorting of a plurality of items including the first key and the second key.

In some embodiments, the second indication is an unsigned byte value one appending to the first key for generating the second key.

In some embodiments, the second key comprises a unique number of the first KV block.

In some embodiments, the first metadata is a first checksum of at least the first piece of data; the second KV block further comprises a second checksum of the first checksum; and the computerized method further comprises: reading the first KV block and the second KV block from the KV storage as a third KV block and a fourth KV block, respectively, the third KV block comprising a second piece of data corresponding to the first piece of data of the first KV block, and the fourth KV block comprising a third checksum and a fourth checksum, comparing a fifth checksum of at least the second piece of data with the third checksum, if the fifth checksum does not equal to the third checksum, comparing a sixth checksum of the third checksum with the fourth checksum, if the sixth checksum equals to the fourth checksum, reading the first KV block from the KV storage as the third KV block, if the sixth checksum does not equal to the fourth checksum, comparing a seventh checksum of the fifth checksum with the fourth checksum, and if the seventh checksum does not equal to the fourth checksum, reading the first KV block and the second KV block from the KV storage as the third KV block and the fourth KV block, respectively.

According to one aspect of this disclosure, there is provided an apparatus comprising: a memory storing computer-executable instructions; and one or more processors; wherein the instructions, when executed, cause the one or more processors to perform the above-described method.

According to one aspect of this disclosure, there is provided one or more non-transitory computer-readable storage media comprising computer-executable instructions, wherein the instructions, when executed, cause one or more circuits such as one or more processors to perform the above-described method.

In another aspect, embodiments of this disclosure provide an apparatus, wherein the apparatus comprises a function or unit to perform any of the methods disclosed herein.

In another aspect, embodiments of this disclosure provide a computer readable storage medium, comprising one or more instructions, wherein when the one or more instructions are run on a computer, the computer performs any of the methods disclosed herein.

In another aspect, embodiments of this disclosure provide a non-transitory computer-readable medium storing instruction the instructions causing a processor in a device to implement any of the methods disclosed herein.

In another aspect, embodiments of this disclosure provide a device configured to perform any of the methods disclosed herein.

In another aspect, embodiments of this disclosure provide a processor, configured to execute instructions to cause a device to perform any of the methods disclosed herein.

In another aspect, embodiments of this disclosure provide an integrated circuit configured to perform any of the methods disclosed herein.

According to one aspect of this disclosure, there is provided a module comprising: one or more circuits for performing the above-described method.

According to one aspect of this disclosure, there is provided one or more processors functionally connected to one or more memories for performing the above-described method.

According to one aspect of this disclosure, there is provided an apparatus comprising: one or more processors functionally connected to one or more memories for performing the above-described method.

According to one aspect of this disclosure, there is provided an apparatus configured to perform the above-described method.

In some embodiments, the apparatus comprises one or more units configured to perform the above-described method.

According to one aspect of this disclosure, there is provided one or more non-transitory, computer-readable storage media comprising computer-executable instructions, wherein the instructions, when executed, cause at least one processing unit, at least one processor, or at least one circuits to perform the above-described method.

According to one aspect of this disclosure, there is provided one or more computer-readable storage media storing a computer program, wherein, when the computer program is executed by an apparatus, the apparatus is enabled to implement the above-described method.

According to one aspect of this disclosure, there is provided a computer program product including one or more instructions, wherein, when the instructions are executed by an apparatus, the apparatus is enabled to implement the above-described method.

According to one aspect of this disclosure, there is provided a computer program, wherein, when the computer program is executed by a computer, an apparatus is enabled to implement the above-described method.

According to one aspect of this disclosure, there is provided a system comprising a node for performing the above-described method.

According to one aspect of this disclosure, there is provided an apparatus for implementing the method in any possible implementation of the foregoing aspects.

The method disclosed herein has various advantages, such as:

by using a specific type key-value for checksum metadata, the method disclosed herein provides backward- and forward-compatibility and ability of automatically cleaning checksums by old codebase;

by using a specific mark (such as byte value one (1) (\u0001)) in the key of the checksum KV block, the method disclosed herein provides cache-optimized, efficient processing of KV blocks, thereby providing improved performance;

the method disclosed herein provides accurate error detection, minimum data pull, and right-to-the-point error detector.

BRIEF DESCRIPTION OF THE DRAWINGS

For a more complete understanding of the disclosure, reference is made to the following description and accompanying drawings, in which:

FIG. 10 shows a pseudocode for selectively processing a KV block having a specific data type of "TombStone", according to some other embodiments of this disclosure;

FIG. 11 is a schematic diagram showing some details of the HetroGuard method, according to some embodiments of this disclosure;

FIG. 12 shows an example of a checksum KV block;

DETAILED DESCRIPTION

Embodiments disclosed herein relate to systems and apparatuses using large language models (LLMs). The systems and apparatuses disclosed herein may comprise suitable modules and/or circuitries for executing various procedures.

As those skilled in the art understand, a "module" is a term of explanation referring to a hardware structure such as a circuitry implemented using technologies such as electrical and/or optical technologies (and with more specific examples of semiconductors) for performing defined operations or processing. A "module" may alternatively refer to the combination of a hardware structure and a software structure, wherein the hardware structure may be implemented using technologies such as electrical and/or optical technologies (and with more specific examples of semiconductors) in a general manner for performing defined operations or processing according to the software structure in the form of a set of instructions stored in one or more non-transitory, computer-readable storage devices or media.

As will be described in more detail below, a module may be a part of a device, an apparatus, a system, and/or the like, wherein the module may be coupled to or integrated with other parts of the device, apparatus, or system such that the combination thereof forms the device, apparatus, or system. Alternatively, the module may be implemented as a stand-alone device or apparatus.

The module usually executes a procedure for performing a method. Herein, a procedure has a general meaning equivalent to that of a method. More specifically, a procedure is a defined method implemented using hardware components for processing data. A procedure may comprise or use one or more functions for processing data as designed. Herein, a function is a defined sub-procedure or sub-method for computing, calculating, or otherwise processing input data in a defined manner and generating or otherwise producing output data.

As those skilled in the art will appreciate, a procedure may be implemented as one or more software and/or firmware programs having necessary computer-executable code or instructions and stored in one or more non-transitory computer-readable storage devices or media which may be any volatile and/or non-volatile, non-removable or removable storage devices such as RAM, ROM, EEPROM, solid-state memory devices, hard disks, CDs, DVDs, flash memory devices, and/or the like. A module may read the computer-executable code from the storage devices and execute the computer-executable code to perform the procedure.

Alternatively, a procedure may be implemented as one or more hardware structures having necessary electrical and/or optical components, circuits, logic gates, integrated circuit (IC) chips, and/or the like.

A. System Structure

Figure 1:
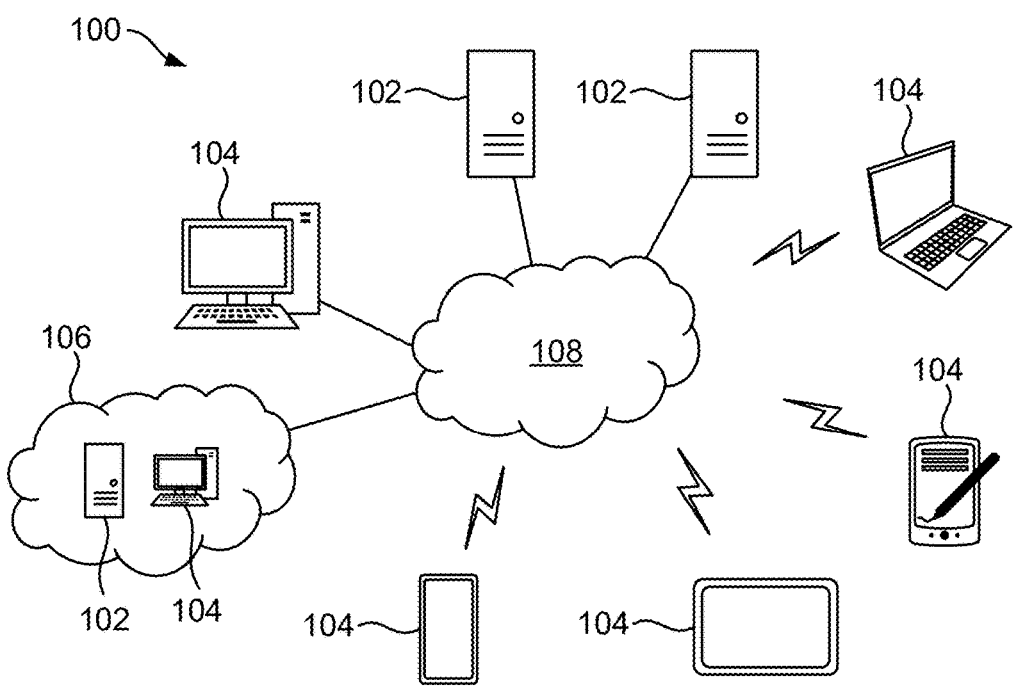
FIG. 1 is a schematic diagram of a computer network system, according to some embodiments of this disclosure.

Turning now to FIG. 1, an exemplary computer network system is shown and is generally identified using reference numeral 100. As shown, the computer network system 100 comprises one or more server computers 102, a plurality of client computing devices 104, and one or more client computer systems 106 functionally interconnected by a network 108, such as the Internet, a local area network (LAN), a wide area network (WAN), a metropolitan area network (MAN), and/or the like, via suitable wired and wireless networking connections.

The server computers 102 may be computing devices designed specifically for use as a server, and/or general-purpose computing devices acting server computers while also being used by various users. Each server computer 102 may execute one or more server programs.

The client computing devices 104 may be portable and/or non-portable computing devices such as laptop computers, tablets, smartphones, Personal Digital Assistants (PDAs), desktop computers, and/or the like. Each client computing device 104 may execute one or more client application programs which sometimes may be called "apps".

Figure 2:
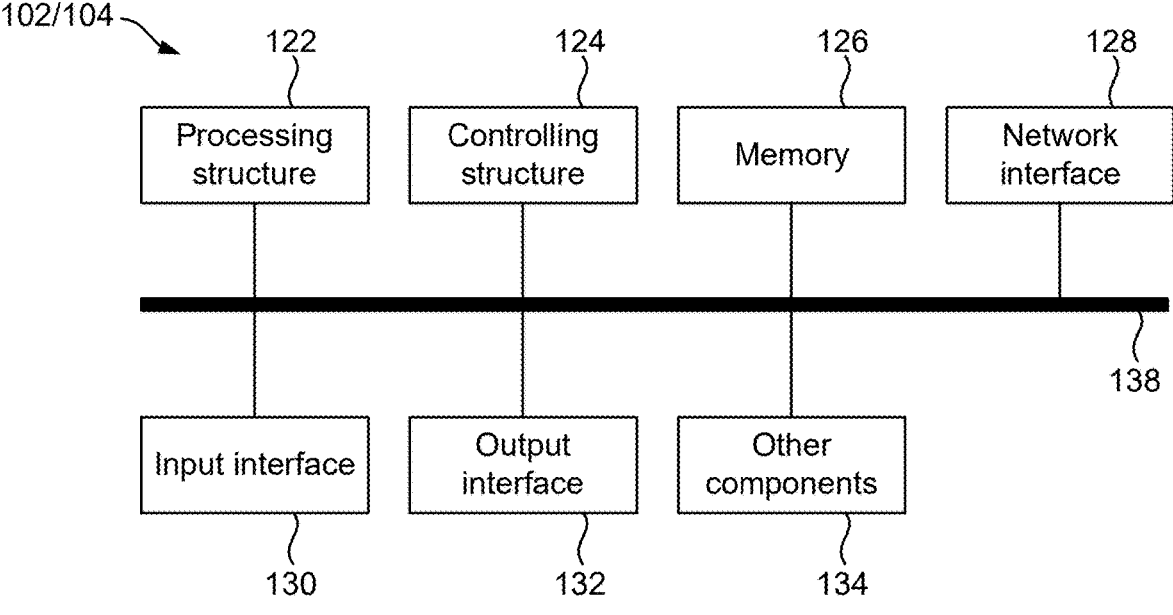
FIG. 2 is a schematic diagram showing a simplified hardware structure of a computing device of the computer network system shown in FIG. 1.

Generally, the computing devices 102 and 104 comprise similar hardware structures such as hardware structure shown in FIG. 2. As shown, the computing device 102/104 comprises a processing structure 122, a controlling structure 124, one or more non-transitory computer-readable memory or storage devices 126, a network interface 128, an input interface 130, and an output interface 132, functionally interconnected by a system bus 138. The computing device 102/104 may also comprise other components 134 coupled to the system bus 138.

The processing structure 122 may be one or more single-core or multiple-core computing processors, generally referred to as central processing units (CPUs), such as INTEL® microprocessors (INTEL is a registered trademark of Intel Corp., Santa Clara, CA, USA), AMD® microprocessors (AMD is a registered trademark of Advanced Micro Devices Inc., Sunnyvale, CA, USA), ARM® microprocessors (ARM is a registered trademark of Arm Ltd., Cambridge, UK) manufactured by a variety of manufactures such as Qualcomm of San Diego, California, USA, under the ARM® architecture, NVIDIA processor, or the like. When the processing structure 122 comprises a plurality of processors, the processors thereof may collaborate via a specialized circuit such as a specialized bus or via the system bus 138.

The processing structure 122 may also comprise one or more real-time processors, programmable logic controllers (PLCs), microcontroller units (MCUs), μ-controllers (UCs), specialized/customized processors, hardware accelerators, and/or controlling circuits (also denoted "controllers") using, for example, field-programmable gate array (FPGA) or application-specific integrated circuit (ASIC) technologies, and/or the like. In some embodiments, the processing structure includes a CPU (otherwise referred to as a host processor) and a specialized hardware accelerator which includes circuitry configured to perform computations of neural networks such as tensor multiplication, matrix multiplication, and the like. The host processor may offload some computations to the hardware accelerator to perform computation operations of neural network. Examples of a hardware accelerator include a graphics processing unit (GPU), Neural Processing Unit (NPU), and Tensor Process Unit (TPU). In some embodiments, the host processors and the hardware accelerators (such as the GPUs, NPUs, and/or TPUs) may be generally considered processors.

Generally, the processing structure 122 comprises necessary circuitries implemented using technologies such as electrical and/or optical hardware components for executing one or more processes, as the design purpose and/or the use case maybe. For example, the processing structure 122 may comprise logic gates implemented by semiconductors to perform various computations, calculations, and/or processings. Examples of logic gates include AND gate, OR gate, XOR (exclusive OR) gate, and NOT gate, each of which takes one or more inputs and generates or otherwise produces an output therefrom based on the logic implemented therein. For example, a NOT gate receives an input (for example, a high voltage, a state with electrical current, a state with an emitted light, or the like), inverts the input (for example, forming a low voltage, a state with no electrical current, a state with no light, or the like), and output the inverted input as the output.

While the inputs and outputs of the logic gates are generally physical signals and the logics or processing thereof are tangible operations with physical results (for example, outputs of physical signals), the inputs and outputs thereof are generally described using numerals (for example, numerals "0" and "1") and the operations thereof are generally described as "computing" (which is how the "computer" or "computing device" is named) or "calculation", or more generally, "processing", for generating or producing the outputs from the inputs thereof.

Sophisticated combinations of logic gates in the form of a circuitry of logic gates, such as the processing structure 122, may be formed using a plurality of AND, OR, XOR, and/or NOT gates. Such combinations of logic gates may be implemented using individual semiconductors, or more often be implemented as integrated circuits (ICs).

A circuitry of logic gates may be "hard-wired" circuitry which, once designed, may only perform the designed functions. In this example, the processes and functions thereof are "hard-coded" in the circuitry.

With the advance of technologies, it is often that a circuitry of logic gates such as the processing structure 122 may be alternatively designed in a general manner so that it may perform various processes and functions according to a set of "programmed" instructions implemented as firmware and/or software and stored in one or more non-transitory computer-readable storage devices or media. In this example, the circuitry of logic gates such as the processing structure 122 is usually of no use without meaningful firmware and/or software.

Of course, those skilled the art will appreciate that a process or a function (and thus the processor 102) may be implemented using other technologies such as analog technologies.

Referring back to FIG. 2, the controlling structure 124 comprises one or more controlling circuits, such as graphic controllers, input/output chipsets and the like, for coordinating operations of various hardware components and modules of the computing device 102/104.

The memory 126 comprises one or more storage devices or media accessible by the processing structure 122 and the controlling structure 124 for reading and/or storing instructions for the processing structure 122 to execute, and for reading and/or storing data, including input data and data generated by the processing structure 122 and the controlling structure 124. The memory 126 may be volatile and/or non-volatile, non-removable or removable memory such as RAM, ROM, EEPROM, solid-state memory, hard disks, CD, DVD, flash memory, or the like.

The network interface 128 comprises one or more network modules for connecting to other computing devices or networks through the network 108 by using suitable wired or wireless communication technologies such as Ethernet, WI-FI® (WI-FI is a registered trademark of Wi-Fi Alliance, Austin, TX, USA), BLUETOOTH® (BLUETOOTH is a registered trademark of Bluetooth Sig Inc., Kirkland, WA, USA), Bluetooth Low Energy (BLE), Z-Wave, Long Range (LoRa), ZIGBEE® (ZIGBEE is a registered trademark of ZigBee Alliance Corp., San Ramon, CA, USA), wireless broadband communication technologies such as Global System for Mobile Communications (GSM), Code Division Multiple Access (CDMA), Universal Mobile Telecommunications System (UMTS), Worldwide Interoperability for Microwave Access (WiMAX), CDMA2000, Long Term Evolution (LTE), 3GPP, fifth-generation New Radio (5G NR) and/or other 5G networks, fifth-generation (6G) networks, and/or the like. In some embodiments, parallel ports, serial ports, USB connections, optical connections, or the like may also be used for connecting other computing devices or networks, although they are usually considered as input/output interfaces for connecting input/output devices.

The input interface 130 comprises one or more input modules for one or more users to input data via, for example, touch-sensitive screen, touch-sensitive whiteboard, touch-pad, keyboards, computer mouse, trackball, microphone, scanners, cameras, and/or the like. The input interface 130 may be a physically integrated part of the computing device

102/104 (for example, the touch-pad of a laptop computer or the touch-sensitive screen of a tablet), or may be a device physically separate from, but functionally coupled to, other components of the computing device 102/104 (for example, a computer mouse). The input interface 130, in some implementation, may be integrated with a display output to form a touch-sensitive screen or touch-sensitive whiteboard.

The output interface 132 comprises one or more output modules for output data to a user. Examples of the output modules comprise displays (such as monitors, LCD displays, LED displays, projectors, and the like), speakers, printers, virtual reality (VR) headsets, augmented reality (AR) goggles, and/or the like. The output interface 132 may be a physically integrated part of the computing device 102/104 (for example, the display of a laptop computer or tablet), or may be a device physically separate from but functionally coupled to other components of the computing device 102/104 (for example, the monitor of a desktop computer).

The computing device 102/104 may also comprise other components 134 such as one or more positioning modules, temperature sensors, barometers, inertial measurement unit (IMU), and/or the like.

The system bus 138 interconnects various components 122 to 134 enabling them to transmit and receive data and control signals to and from each other.

Figure 3:
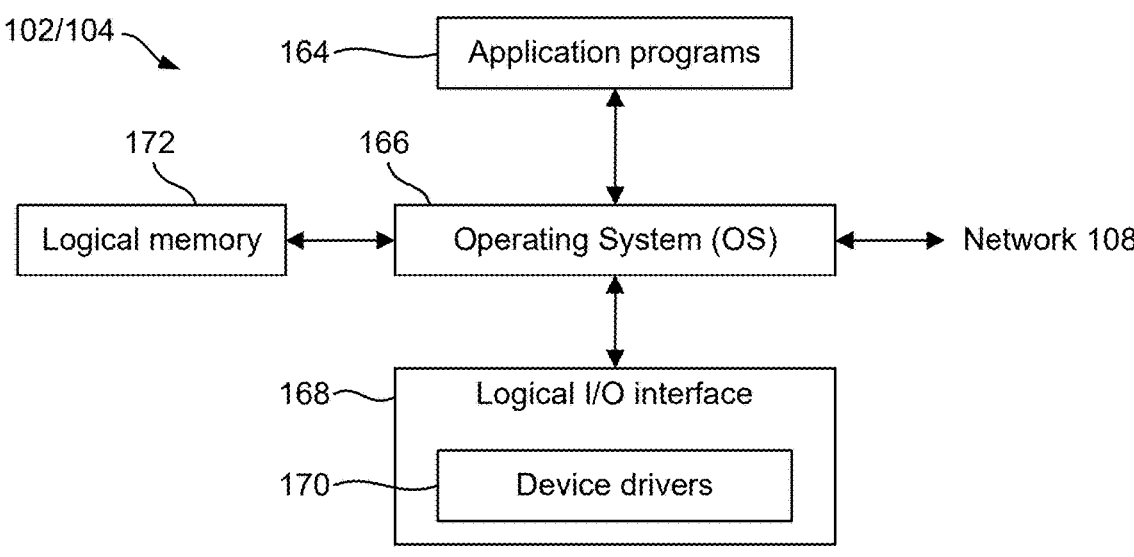
FIG. 3 is a schematic diagram showing a simplified software architecture of a computing device of the computer network system shown in FIG. 1.

FIG. 3 shows a simplified software architecture of the computing device 102 or 104. On the software side, the computing device 102 or 104 comprises one or more application programs 164, an operating system 166, a logical input/output (I/O) interface 168, and a logical memory 172. The one or more application programs 164, operating system 166, and logical I/O interface 168 are generally implemented as computer-executable instructions or code in the form of software programs or firmware programs stored in the logical memory 172 which may be executed by the processing structure 122.

The one or more application programs 164 executed by or run by the processing structure 122 for performing various tasks.

The operating system 166 manages various hardware components of the computing device 102 or 104 via the logical I/O interface 168, manages the logical memory 172, and manages and supports the application programs 164. The operating system 166 is also in communication with other computing devices (not shown) via the network 108 to allow application programs 164 to communicate with those running on other computing devices. As those skilled in the art will appreciate, the operating system 166 may be any suitable operating system such as MICROSOFT® WINDOWS® (MICROSOFT and WINDOWS are registered trademarks of the Microsoft Corp., Redmond, WA, USA), APPLE® OS X, APPLE® iOS (APPLE is a registered trademark of Apple Inc., Cupertino, CA, USA), Linux, ANDROID® (ANDROID is a registered trademark of Google LLC, Mountain View, CA, USA), or the like. The computing devices 102 and 104 may all have the same operating system, or may have different operating systems.

The logical I/O interface 168 comprises one or more device drivers 170 for communicating with respective input and output interfaces 130 and 132 for receiving data therefrom and sending data thereto. Received data may be sent to the one or more application programs 164 for being processed by one or more application programs 164. Data generated by the application programs 164 may be sent to the logical I/O interface 168 for outputting to various output devices (via the output interface 132).

The logical memory 172 is a logical mapping of the physical memory 126 for facilitating the application programs 164 to access. In this embodiment, the logical memory 172 comprises a storage memory area that may be mapped to a non-volatile physical memory such as hard disks, solid-state disks, flash drives, and the like, generally for long-term data storage therein. The logical memory 172 also comprises a working memory area that is generally mapped to high-speed, and in some implementations volatile, physical memory such as RAM, generally for application programs 164 to temporarily store data during program execution. For example, an application program 164 may load data from the storage memory area into the working memory area, and may store data generated during its execution into the working memory area. The application program 164 may also store some data into the storage memory area as required or in response to a user's command.

In a server computer 102, the one or more application programs 164 generally provide server functions for managing network communication with client computing devices 104 and facilitating collaboration between the server computer 102 and the client computing devices 104. Herein, the term "server" may refer to a server computer 102 from a hardware point of view or a logical server from a software point of view, depending on the context.

As described above, the processing structure 122 is usually of no use without meaningful firmware and/or software. Similarly, while a computer system such as the computer network system 100 may have the potential to perform various tasks, it cannot perform any tasks and is of no use without meaningful firmware and/or software. As will be described in more detail later, the computer network system 100 described herein and the modules, circuitries, and components thereof, as a combination of hardware and software, generally produces tangible results tied to the physical world, wherein the tangible results such as those described herein may lead to improvements to the computer devices and systems themselves, the modules, circuitries, and components thereof, and/or the like.

B. Key-Value Databases and Methods for Detecting Data Integrity Issue in Heterogeneous Cluster Environments In some embodiments, the computer network system 100 is a key-value (KV) database system. As those skilled in the art understand, a KV database (also called a "KV store") is a type of NoSQL database (that is, non-relational database) wherein data is stored in a "key-value" format such as a key-value pair (that is, a pair of a data value and corresponding key), with the key acting as a unique identifier and projecting it to the corresponding value. A KV database is often optimized for reading and writing the data stored therein. Examples of KV databases include RocksDB, MongoDB (developed by MongoDB Inc. of New York, NY, U.S.A.), and DuckDB (developed by DuckDB Labs of Amsterdam, Netherlands), each with its own set of features and optimizations. The flexibility of the KV-database model allows for the storage of a diverse range of data, from simple objects to intricate compound objects. One of the primary benefits of KV databases is their high partitionability, which allows horizontal scaling that exceeds the capabilities of other database models.

Figure 4:
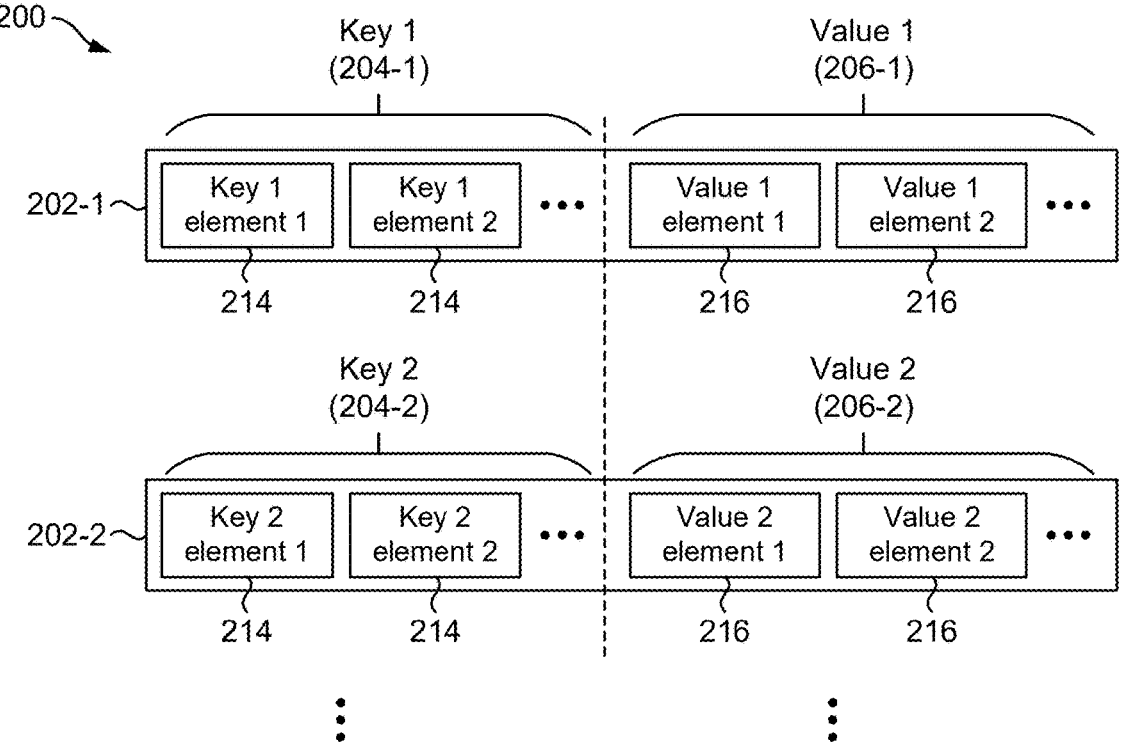
FIG. 4 is a simplified schematic diagram showing the structure of a key-value (KV) database for storing a plurality of KV blocks.

FIG. 4 is a simplified schematic diagram showing the structure of a KV database 200. As shown, the KV database 200 comprises one or more items 202 (also denoted "KV blocks"). Each item 202 comprises a key 204 and a value 206 (also denoted a "piece of data" or a "data piece"). Each key 202 comprises one or more key elements 214, and each value 206 comprises one or more value elements 216. The items 202 in the KV database 200 may be indexed based on the keys 204.

For example, the key "Key 1" (204-1) of the KV block 202-1 has a plurality of elements, "Key 1 element 1", "Key 1 element 2", . . . , the combination thereof forming the key 204-1 of the KV block 202-1. The value "Value 1" (206-1) of the KV block 202-1 has a plurality of elements, "Value 1 element 1", "Value 1 element 2", . . . , the combination thereof forming the value 206-1 of the KV block 202-1. Similarly, the key "Key 2" (204-2) of the KV block 202-2 has a plurality of elements, "Key 2 element 1", "Key 2 element 2", . . . , the combination thereof forming the key 204-2 of the KV block 202-2. The value "Value 2" (206-2) of the KV block 202-2 has a plurality of elements, "Value 2 element 1", "Value 2 element 2", . . . , the combination thereof forming the value 206-2 of the KV block 202-2.

Key-value metadata (such as the key-value pair) is essential in various situations in cloud databases, where it requires storing and utilizing additional information related to the specified key and value in downstream application processes. An example is the Extract, Transform, and Load (ETL) process, where data from various sources are combined into a centralized repository known as a data warehouse. Metadata is heavily relied upon in this process, as it facilitates the application of business rules to clean, organize, and prepare raw data for storage, data analysis, and machine learning (ML) applications. Another significant example in the cloud database context is verifying data integrity. Cloud KV stores often form a distributed KV cluster due to the substantial volume of data and processing involved. As these clusters evolve, they encompass a diverse range of nodes (that is, a computing device 102 or 104) with varying hardware capabilities, each running a distinct version of the database software code, resulting in heterogeneous KV clusters.

In such environments, verifying data correctness is essential, as data frequently migrate between various nodes, and the hardware or software characteristics of each node may introduce errors such as value-level errors in the KV store entries. As described above, many checksum systems or methods have been used in prior for detecting value-level errors.

While different checksum methods differ on their methods of storing data and on their levels of data interpretation and validations, they usually follow similar process steps summarized below:

1. Calculation:

At the source, a checksum is generated by applying a specific algorithm to a data piece. This algorithm usually involves summing up the binary values of all the bytes of the data piece, sometimes with additional operations such as bitwise rotations or other mathematical transformations.

The result is the checksum, which is a fixed-size data chunk, typically a few bytes long.

2. Appending:

The checksum is then stored along with the data piece. When the data piece is transmitted, the corresponding checksum is also transmitted usually following the data piece. When the data piece and the checksum are stored, the checksum may be kept in a separate location associated with the file or data piece.

3. Verification:

When the data piece is read to be used, the checksum algorithm is applied again to the data piece that was read. A new checksum is computed and compared with the stored checksum.

US 12,572,526 B2

11

4. Detection:

If the two checksums match, the data piece is considered to be intact and free of errors.

If there is a discrepancy between the two checksums, it indicates that an error occurred during transmission or storage, and the data piece may be corrupted.

Checksums are widely used because they are simple to implement and have low computational overhead. However, for critical applications requiring high reliability, stronger methods are often employed alongside or instead of simple checksums.

Some prior-art methods add checksum to the footer or payload of a KV store. As those skilled in the art understand, the footer in a KV store is a section that typically contains essential metadata about the KV database. This metadata can include information such as the structure of the data, versioning information, pointers to index blocks, and the like. The checksum serves as a means to verify the integrity of the KV when it is read back into memory or during recovery procedures.

Some other prior-art methods add the checksum to the sorted string table (SST) block meta (per-key and block-based). As those skilled in the art understand, SSTs are immutable data structures used by databases. In these methods, the checksum can be stored in the SSTs metadata blocks. With respect to the level of the granularity of data (that is, the level of detail or precision of the data) added to the checksum, these methods usually have three implementations:

Per-key checksum, which involves calculating and storing a checksum for each key-value entry within an SST. It allows for the detection of corruption in individual entries, providing a granular level of integrity checking.

Block-based checksum, which is a separate checksum (in addition to per-key checksums (wherein each per-key checksum is a checksum for a key-value data)) calculated for a block of data (which is the ensemble of one or more data entries). This block-level checksum provides a way to verify the integrity of a larger chunk of data, which includes multiple key-value pairs.

SST block metadata, which includes various details about the block, such as the size thereof, the range of keys therewithin, and the checksums thereof. Storing checksums in the block metadata is a standard practice that helps in detecting and isolating corrupted data.

Various database systems and file formats have implemented different methods to protect against data corruption. It's a common approach in systems that require high reliability and consistency, such as file systems, databases, and distributed storage systems to use checksum.

In the case of the using value payload to store checksum, after computing the checksum, the calculated checksum is considered as a list of characters and is added to the end of the value using concatenation operation, wherein either the size of the checksum is fixed or some special character is used to identify the checksum block.

This method can be backward-compatible if a method to identify either the size of the checksum block or the separator thereof can be used. In many situations, a large block is used, and it stores the output of a formula that creates a unique signature, with which the probability of getting such footer for a random data is very low. This can help the system to also accept the old data and, by performing the signature operation, to distinguish old data from new data.

For methods that use metadata block to store checksums, the methods need to specify the level of the checksum calculation. This level can be per key value, per data block, or per SST level. For block based and KV level, an indexing system is required to address the data elements. For example, in RocksDB (which is an embedded database for key-value data, developed by Meta Platforms, Inc. of Menlo Park, CA, U.S.A.), data iterator counts the number of the block and, as the size of the checksum blocks is known, finds the checksum block as:

$$\text{Checksum index} = \text{offset} + \text{iterator index} \times \text{Size(checksum)}$$

where offset represents the first-place location of the metadata block. For the block level, the entire data-block checksum (which is a block-based checksum) is stored in the metadata block. Therefore, in this case, the corresponding data block's checksum can be found using the block iterator.

The prior-art methods have several disadvantages.

For example, when a payload is used for storing checksum, the data and the checksum are located in the same place. When errors occur, the KV block may be re-fetched, and there is no ambiguity in the system. However, the main problem with this type of checksum is that user data must be manipulated, and the checksum can be held at its end, which may cause a security problem. Furthermore, the query results (such as the value of the keys) cannot be processed by an old node (that is, a computing device 102 or 104 with an old codebase but without forward-compatibility), and the old node returns the user data at the end. The idea of adding a checksum to the metadata due to separation requires a checksum itself to ensure the user in the event of discrepancies. Furthermore, since the checksum value is stored in a separate place, the search for this information may result in the search for a new memory page, which has a large negative impact on the performance of the entire system. System performance may be further reduced when performing checksum on KV blocks. Also, this method needs to have fixed size checksum length to be applied to all data.

The method of adding a checksum to the metadata because of separation requires the checksum itself to ensure that the user is not affected by the discrepancy. In addition, since the checksum value is stored in a separate location, extracting that information may result in a new memory page, which may have a huge negative impact on the performance of the entire system. System performance may be further reduced when checking the KV block. Also, when the checksum is used for higher granularities such as data block and SSTs, it may require more time to be processed by the checksum algorithm.

Both methods may have the problem of maintaining the checksum when switching to no-checksum mode, which means that if data is transferred to the old codebase node or even if the system is turned off, the storage that the checksums occupy is not released and the cost of such storage cannot be eliminated.

KV stores frequently comprise heterogeneous clusters, characterized by varying hardware specifications of the deployment nodes, with each node potentially running a distinct version of the KV store software. This heterogeneity is accompanied by the diverse metadata that they need to manage. In the following, various embodiments of a new method (denoted the "HetroGuard" method) for storing checksum (or more generally, metadata) in KV databases are disclosed. The HetroGuard method disclosed herein may be used for detecting data integrity issue in heterogeneous cluster environments. The HetroGuard method disaggregates the original data from its associated metadata to promote independence between them, while maintaining their interconnection during usage. This makes the metadata opaque from the downstream processes and the other KV stores in the cluster. The HetroGuard method also ensures that the KV and metadata entries are stored in the vicinity of each other in memory and storage. This allows the Hetro-Guard method to optimally utilize the caching mechanism without extra storage read overhead for metadata retrieval. Deployment of the HetroGuard method in RocksDB for ensuring data integrity has demonstrated rapid data validation with minimal effect on performance.

Herein, data may be generally categorized into user data and metadata. User data is the data generally used by users for describing some facts, and metadata is data about the user data.

The HetroGuard method provides a technical solution for solving at least some of the above-described problems. More specifically, the HetroGuard method provides a metadata management solution designed with privacy and efficiency in mind for diverse KV stores.

The HetroGuard method introduces metadata as a part of the KV structure that is specifically designed to work in a heterogeneous cluster while maintaining backward and forward compatibility. The HetroGuard method also ensures the privacy of each node's metadata. To ensure data integrity, a checksum part is included in the payload of the metadata entries. This checksum represents the checksum of the corresponding KV entry, providing a means to verify the integrity of the data. Additionally, the HetroGuard method ensures that both the KV store pairs and their corresponding metadata are written on the same memory page throughout various processes, such as compaction. This ensures efficient and consistent handling of data and metadata within the system.

The HetroGuard method is backward and forward compatible, and therefore can be used for heterogeneous cloud systems. The HetroGuard method is cache-optimized, that is, it requires the minimum number of memory-page requests to validate checksums. Also, if the code stops to use the data checksum and/or uses old code without performing checksum service, the additional storage that is used for checksums may be automatically cleaned from the payload after the checksums are turned off. Moreover, the Hetro-Guard method is a precise and accurate detector when data problems occur, which may be useful for automatic repair systems for accurately detecting errors (see FIG. 15, described in more detail later). The HetroGuard method also allows a modularized design with minimum impact to the original code.

The HetroGuard method takes into account at least some of the following objectives for metadata management in cloud KV stores:

Performance:

The metadata for each KV should be located close to its corresponding data because, in many instances, the application requires access to the metadata immediately after reading the KV (for example, verifying data correctness). To enhance cache efficiency and minimize cache misses and memory page (block) lookups, the metadata should be placed on the same memory block as the corresponding KV.

Heterogeneity:

Cloud databases often employ a distributed KV store architecture, where each KV store shard is hosted on a separate node. These nodes can have varying hardware specifications, and the software version of the KV store on each node might differ. Within this diverse KV store cluster, it is crucial to ensure that introducing the KV metadata does not affect any version of KV store applications. This necessitates backward compatibility, allowing older KV data to function with current data, as well as forward compatibility, ensuring that the new version of KV operates with previous software code.

Privacy:

In a clustered environment, each KV shard on a node contains a subset of all KVs. These KVs could represent private data specific to each node. Consequently, the metadata containing information about the key values of that node should be stored on the same edge node and should not be migrated to other shards.

With these objectives, the HetroGuard method in various embodiments provides a plurality of features such as:

String keys and lexical sorting:

The HetroGuard method treats keys as a type of strings. In other words, the HetroGuard method considers that all keys in the KV database are strings, and uses a suitable sorting function to sort the keys in the lexical order.

String keys are common in databases because they can represent complex identifiers that are human-readable. Lexical order sorting means that the keys are sorted in a manner similar to how words are listed in a dictionary; that is, alphabetically and by character sequence. For example, "apple" would come before "banana", and "021" would come before "20". This type of sorting is natural for strings and is widely used in various computer science applications.

Applicability to KV databases:

By treating keys as strings and using lexical sorting, the HetroGuard method may be universally applied to any KV database. The universal applicability of the HetroGuard method means that it can be integrated with various existing systems without the need for extensive customization.

Focus on checksum and metadata storage:

While the HetroGuard method may be used for storing checksums (wherein a checksum is a form of metadata that is used to verify the integrity of data), the HetroGuard method is not limited to this type of metadata only. Rather, the use of the HetroGuard method may be extended to any form of one-to-one metadata associated with keys in a KV database, wherein metadata in this context refers to auxiliary information that needs to be stored alongside the data, which may be timestamps, permissions, or other data attributes.

Unlimited keys and indexing:

The HetroGuard method considers that there is no limitation on the number of keys in the database (which is the case in almost all KV databases such as RocksDB, MongoDB, DuckDB, and the like), and the keys are stored with indexing.

Indexing is a data structure technique used to quickly locate and access the data. This is a common characteristic of KV databases, as they are designed to handle a large number of entries and provide fast retrieval through efficient indexing mechanisms.

Improving the OBS index system:

The HetroGuard method may be used to improve the object storage backend (OBS) index system (such as RocksDB, which is one of the systems being used by the OBS index architecture as one of its sub-systems), which is responsible for storing and managing data objects. OBS systems are integral to cloud storage solutions, where data is stored in containers called "buckets", and is accessed via unique identifiers.

Specific application to RocksDB:

While the HetroGuard method may be applied to any KV database, the HetroGuard method may be specifically applied to RocksDB (which is a high-performance KV store used in various systems, and is known for its efficient storage and retrieval capabilities) including OBS index architectures.

In various embodiments, the HetroGuard method may be used in various products and/or services such as:

Cloud storage optimization service:

By integrating with the HetroGuard method, the cloud storage optimization service may improve data integrity, reduce development costs, enhance user experience, and increase trust among business owners and users.

Error detection and correction for cloud services:

By integrating with the HetroGuard method, the error detection and correction for cloud services may more efficiently detect and correct errors in data storage systems.

Database management for key-value stores:

The HetroGuard method may be implemented within various KV databases to ensure data integrity and reliability across heterogeneous clusters.

Comparing to existing methods, the HetroGuard method in some embodiments provides additional key-value blocks inserted for checksum purposes. Accordingly, in some embodiments, KV databases using the HetroGuard method may exhibits a consistent database size increase that correlates with the implementation of the HetroGuard method. However, when migrating data to KV databases using old codebase, the database size may shrink.

The HetroGuard method in some embodiments uses a unique identifier for checksum key-value blocks to maintain compatibility. In some embodiments, the HetroGuard method may provide an application programming interface (API) for users to set the checksum type.

The HetroGuard method reduces the latency in data operations, which is particularly beneficial for processing of large workloads. Moreover, by using the HetroGuard method, the performance of range operations may be improved.

As those skilled in the art will appreciate, in order to have a forward- and backward-compatible checksum, one needs to separate the code from versioning and pass it into data level. Therefore, in some embodiments, the HetroGuard method calculates one or more checksums (which is a type of metadata) of a KV block storing a data piece (denoted a "data KV block"), and stores the calculated one or more checksums as the value 206 of another KV block (denoted a "checksum KV block") in the KV database 200, wherein the checksum KV block is associated with the corresponding data KV block, and the checksum KV block is marked such that it is unretrievable by another checksum method such as an old checksum method, for backward-compatibility. Moreover, the checksum KV block is also marked such that it is invisible to users and users cannot query it.

Figure 5:
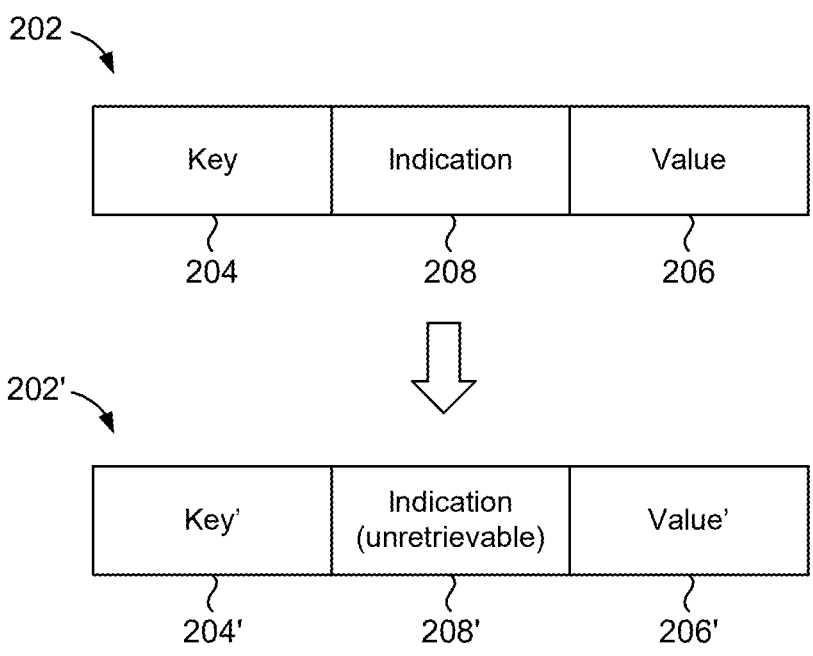
FIG. 5 is a schematic diagram showing the generation of a checksum KV block for a data KV block using a Hetro-Guard method, according to some embodiments of this disclosure.

FIG. 5 is a schematic diagram showing the generation of a checksum KV block 202' for a data KV block 202, according to some embodiments of this disclosure.

As shown, the data KV block 202 comprises a unique key 204, an indication 208, a value 206, and may also comprise other fields (not shown). The data KV block 202 is compatible with old codebase (for example, a codebase not implementing the HetroGuard method disclosed herein), and the indication 208 is used by the old codebase as an indication of a value type and/or an operation (Op) type.

The checksum KV block 202' has the same structure and comprises a key (denoted "key'") 204', an indication 208', and a value (denoted "value'") 206'.

The value' 206' comprises one or more checksums of for validation of the value 206 of the data KV block 202.

The indication 208' comprises a specific value indicating to the old codebase for omitting or ignoring the value' 206' or otherwise rendering the value' 206' unretrievable, or even instructing the old codebase to delete any KV block whose indication 208 (or 208') having the specific value.

For example, in RocksDB that does not implement the HetroGuard method disclosed herein (that is, an old codebase), a KV block whose value type has a specific value of "TombStone" will be deleted by the RocksDB during data processing. Therefore, in some embodiments, the checksum KV block may be marked as "TombStone" (that is, its value type has a specific value of "TombStone") with a flag to separate it from the actual TombStones.

An old codebase (for example, a codebase not implementing the HetroGuard method disclosed herein) will simply delete the checksum KV block without retrieving the value thereof. On the other hand, a new codebase (for example, a codebase implementing the HetroGuard method disclosed herein) will recognize that the KV block 202' is a checksum KV block, and retrieve the value' 206' for validating the value 206 of the data KV block 202 associated with the checksum KV block 202'.

Various methods may be used for associating a data KV block 202 with a checksum KV block 202' and/or for indicating that which KV block is a data KV block and which is a checksum KV block.

In these embodiments, a checksum KV block 202' comprises the unique identifier of the corresponding data KV block 202 so as to establish the association therebetween.

For example, in some embodiments wherein each data KV block 202 comprises a unique key 204, the key' 204' of the checksum KV block 202' may comprise the unique key 204 of the corresponding data KV block 202. In some other embodiments, the data KV block 202 may comprise another field (such as a sequence number field) storing a unique value, and the key' 204' of the checksum KV block 202' may comprise the unique value of the sequence number field of the corresponding data KV block 202. Alternatively, the key' 204' of the checksum KV block 202' may comprise a combination (such as a concatenation) of the key 204 and the unique value of the sequence number field of the corresponding data KV block 202. In yet some other embodiments, the checksum KV block 202' may use another field (rather than the key' 204') to store the unique identifier of the corresponding data KV block 202.

In these embodiments, a KV block is a checksum KV block 202; if its indication 208 has the above-described specific value (such as "TombStone") and it is associated with another KV block whose indication 208 does not have the above-described specific value (that is, an indirect indication).

Figure 6:
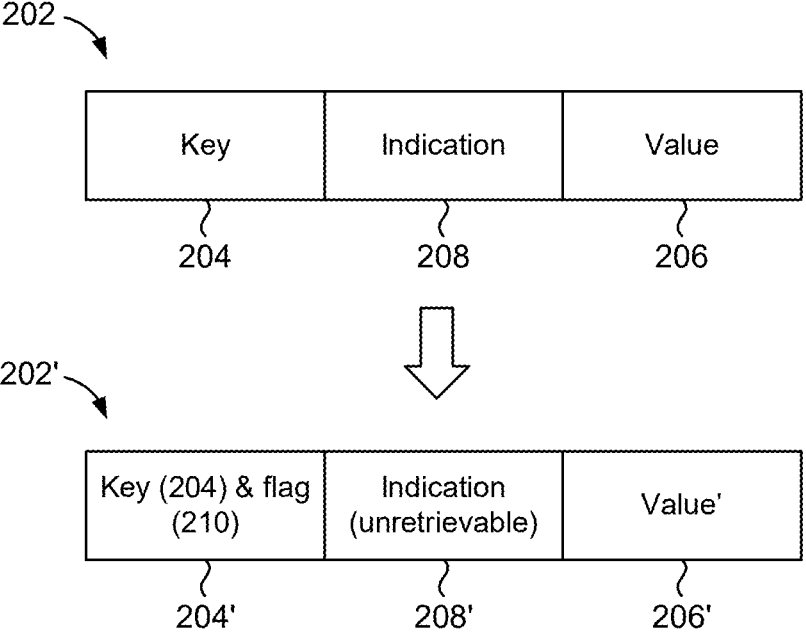
FIG. 6 is a schematic diagram show the generation of a checksum KV block for a data KV block using the Hetro-Guard method, according to some other embodiments of this disclosure.

In some embodiments as shown in FIG. 6, the checksum KV block 202' is similar to that shown in FIG. 5 except that the checksum KV block 202' further comprises a flag 210 (for example, its key 204' combines the key 204 and the flag 210) for indicating that the KV block is a checksum KV block 202'. An example of such a flag is an unsigned byte one (\u0001), which may be used for other purposes as well (described in more detail later).

In the following, the details of the HetroGuard method are described using RocksDB as an example. Accordingly, the test results (such as performance numbers and other relevant data) of the HetroGuard method described herein are based on RocksDB, which provide insights on how the HetroGuard method translates into real-world performance improvements when applied to an OBS index system using RocksDB. However, as described above, the HetroGuard method is not limited to RocksDB and may be used in any KV databases.

Before describing the details of various embodiments of the HetroGuard method, the RocksDB architecture is first described.

RocksDB, created by Meta in 2012, is a highly efficient key-value storage engine. It is specifically optimized to utilize the capabilities of solid-state drives (SSDs). This storage engine is mainly designed for large-scale distributed applications and is implemented as a library component that can be integrated into higher-level applications.

Figure 7:
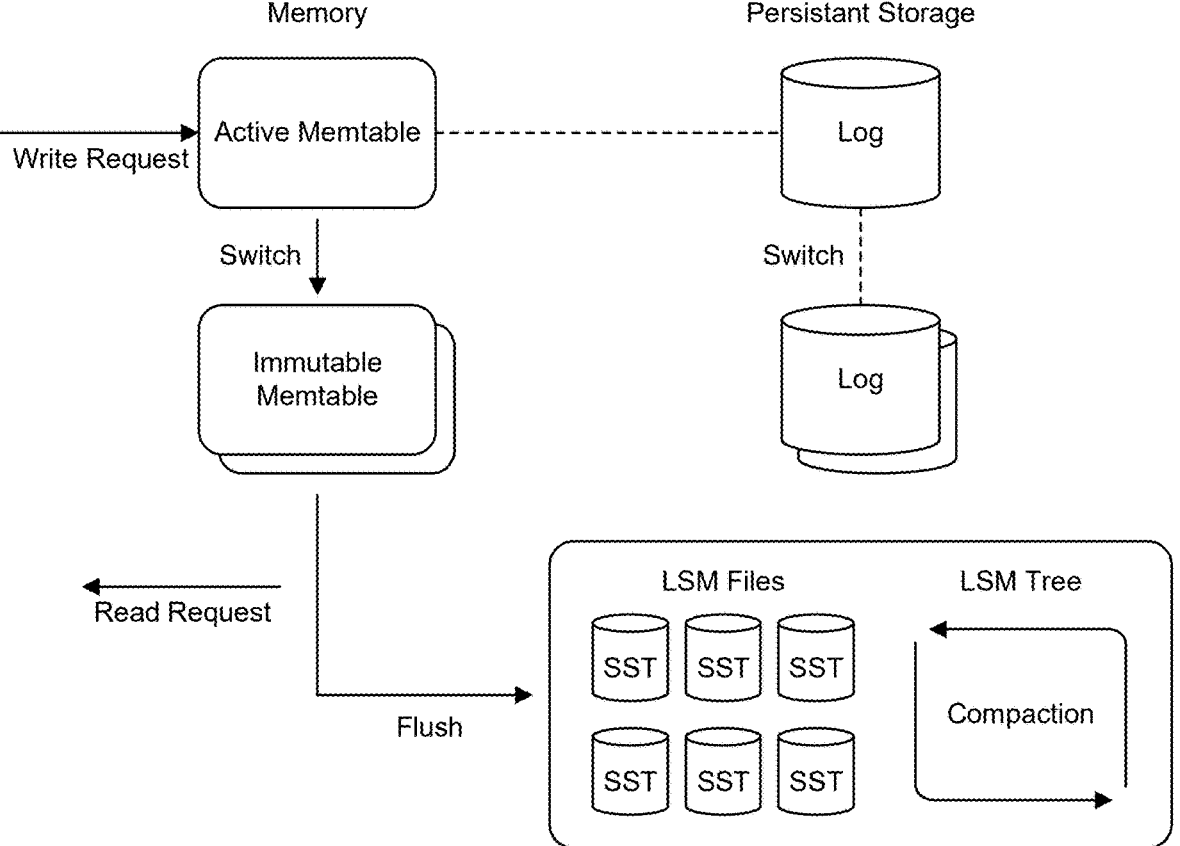
FIG. 7 is a schematic diagram showing the RocksDB architecture.

FIG. 7 is a schematic diagram showing the RocksDB architecture. As shown, RocksDB uses Log-Structured Merge (LSM) trees as its core data structure. When data is written to RocksDB, it undergoes two main processes.

Initially, the data are placed into an in-memory write buffer known as the memtable. At the same time, a Write-Ahead Log (WAL) is generated on the disk. The memtable is structured as a skiplist, maintaining the data in an ordered fashion with an insertion and search complexity of O(logn). The WAL acts as a recovery tool in the event of failures, although its use is optional.

Figure 8:
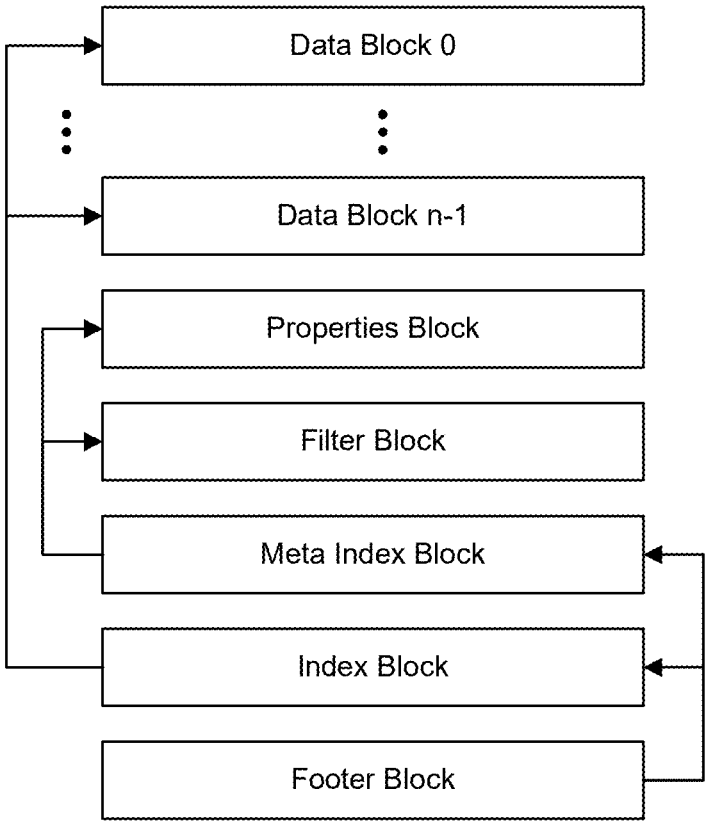
FIG. 8 is a schematic diagram showing the RocksDB block-based sorted string table (SST) format.

Once the memtable hits a predetermined size threshold, both the memtable and the WAL are set to an immutable state. Then, new memtable and WAL instances are created for future writes. The data in the memtable are then transferred to an SST file on the disk, and the old memtable and WAL are discarded. Each SST organizes data in a sorted sequence and is divided into equally sized blocks. Furthermore, each SST contains an index block that contains one index entry per data block, enabling efficient binary search operations. FIG. 8 shows the RocksDB block-based SST format.

The LSM tree in some KV stores such as RocksDB and LevelDB is composed of several levels, each of which is built from multiple SSTs. The newest SSTs are generated by flushing memtables and placed in Level-0. Levels higher than Level-0 are generated through a process called compaction. The size of the SSTs on each level is restricted by configurable parameters.

If the target size for a specific level, such as Level-L, is exceeded, a subset of SSTs from Level-L is chosen and combined with overlapping SSTs from Level-(L+1). This compaction process eliminates deleted and overwritten data, optimizing the table for improved read performance and space efficiency. Consequently, written data are gradually migrated from Level-0 to the highest level. The compaction I/O operations are efficient as they can be parallelized and involve bulk reads and writes of entire files. However, this process requires fetching multiple data from the disk and creating new SSTs, which are then written back to the disk. These operations are prone to errors caused by software and hardware failures (and sometimes network issues).

As the operational load of the system grows, vertically scaling a single node might not be enough to solve scalability problems. This necessitates the formation of a cluster of KV stores. Within this cluster, various KV store applications are installed on distinct nodes, allowing them to manage the increased loads together. These nodes interact with one another or with a dispatcher edge node to efficiently address queries.

Concerns about privacy also motivate the use of KV store clusters. When various applications or users need access to certain parts of the data or specific KV nodes, clustering offers essential isolation and management. Dividing the data among the clusters allows each application or user to reach their specific portion of the data, guaranteeing privacy and data separation.

KV store clusters frequently comprise heterogeneous clusters, characterized by varying hardware specifications of the deployment nodes, with each node potentially running a distinct version of the KV store software. The diversity in hardware and software versions complicates the process of updating the KV store. Updates to the KV store software must be compatible with the data of the current versions running on other nodes in the cluster. Incompatibility could lead to cluster failures, resulting in interruptions in data access and availability. Thus, when adding metadata per key-value in a KV store cluster, it is important to design the system so the data remain unobservable from other shards or nodes. This ensures both privacy and compatibility, facilitating efficient data management and access within the cluster while preserving the system's overall integrity and consistency.

With above description, the HetroGuard method is now described. In various embodiments described below, the HetroGuard method is a cache-optimized method for storing metadata in KV stores. Although the HetroGuard method is a versatile approach for managing metadata, the HetroGuard method may be specifically applied for data integrity and error detection of data in a KV store such as data in RocksDB. Herein, error detection is defined as identifying the discrepancies between the stored value and the original value (various examples of error detection will be described in more detail later), which involves storing checksum metadata per key-value.

While the HetroGuard method is applicable to all KV stores, the following describes a practical implementation and evaluation of the HetroGuard method on a heterogeneous cluster of RocksDB nodes, a high-performance embedded database for key-value data. The focus is on ensuring data integrity in a cluster of RocksDB shards that constitute a cloud KV store, where the DB provider must assure users of data correctness. In the following, checksum is used as an example of the metadata for easy of description.

Figure 9:
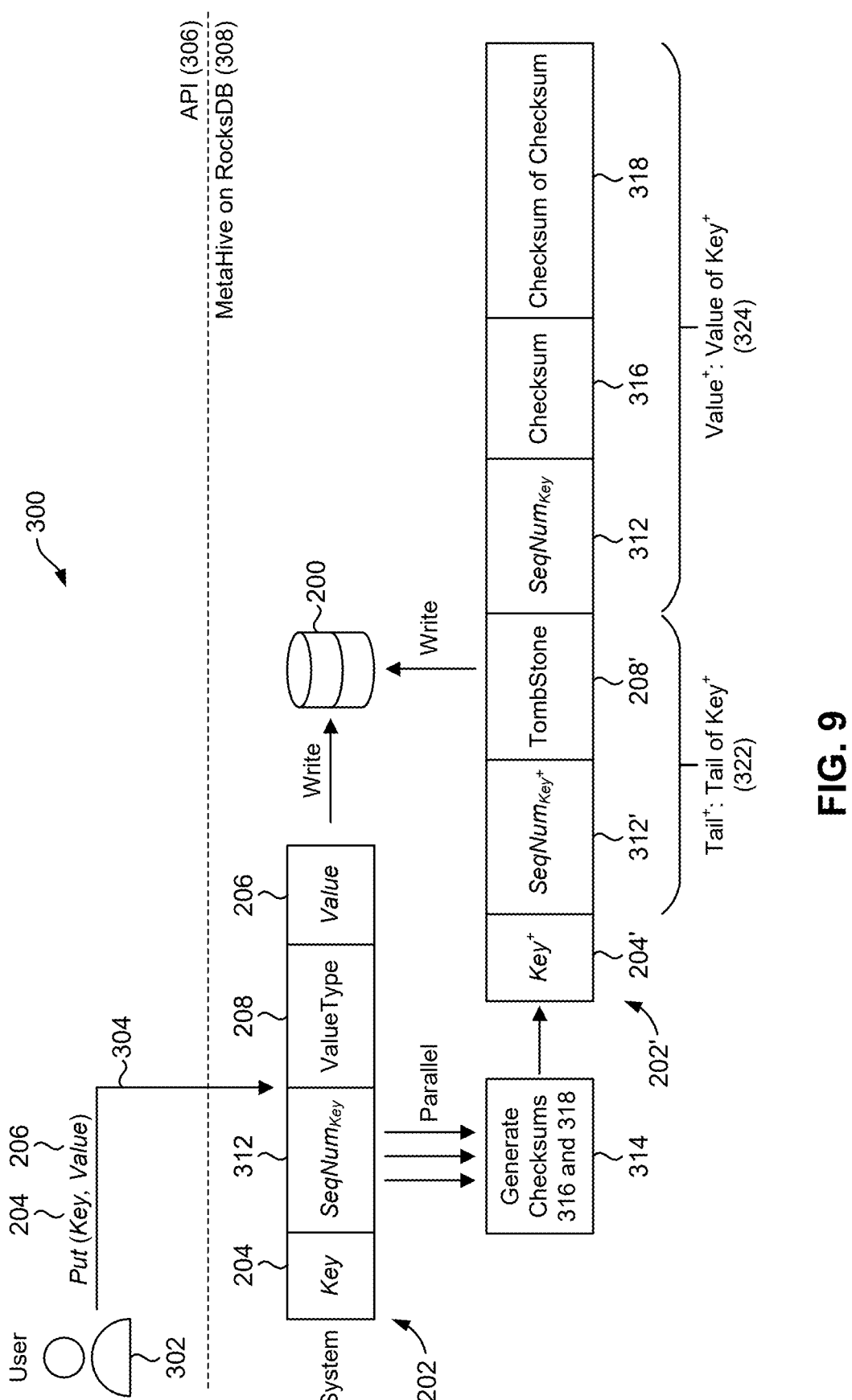
FIG. 9 is a schematic diagram showing an example of the HetroGuard method for storing checksum (or more generally, metadata) in KV databases, according to some embodiments of this disclosure.

FIG. 9 is a schematic diagram showing an example of the HetroGuard method. As shown, a user 302 uses the PUT command 304 via an API 306 to write a data piece or value 206 associated with a key 204 into the KV database 200 which in this example is a RocksDB 308 using the HetroGuard method.

Following the PUT command 304, the system 100 creates a data KV block 202 comprising the key 204, an automatically generated unique number 312 (denoted a "sequence number", a "SeqNum", or a "SN"), a value type (ValueType) 208, and the value 206. For ease of differentiation, the SeqNum 312 of the data KV block 202 is also denoted "SeqNum$_{Key}$" or "data SeqNum".

In this example, clusters are used, wherein the key 204 is for identifying the cluster of KV blocks 202 (that is, all KV blocks 202 in the same cluster have the same key 204), and the data SeqNum 312 is used for identifying the KV block 202 in the cluster (that is, the combination of the key 204 and the data SeqNum 312 corresponds to the key 204 shown in FIG. 4 and uniquely identifies the KV block 202 in the KV database 200).

The system 100 also calculates or otherwise generates one or more checksums for the data KV block 202 (step 314), and then generates a checksum KV block 202' as a special type of KV block (that is, a KV block designated solely for checksum storage) associated with the data KV block 202. In this example, step 314 generates two checksums 316 and 318. The first checksum 316 is a checksum calculated using the key 204, the data SeqNum 312, the value type 208, and the value 206 of the data KV block 202, for example, as:

$$C=XOR(XXH3(K), XXH3(SeqNum_{Key}), XXH3(ValueType), XXH3(Value)) \quad (1)$$

where C is the first checksum 316, XOR is the exclusive-OR function, XXH3 is the XXHash function, K is the key 204 of the data KV block 202, SeqNum$_{Key}$ is the data SeqNum 312 of the data KV block 202, ValueType is the value type 208 of the data KV block 202, and Value is the data piece 206 of the data KV block 202.

The second checksum 318 is a checksum of the first checksum 316, which is calculated, for example, as:

$$CC=XXH3(C) \quad (2)$$

where CC is the second checksum 318 and C is the first checksum 316 calculated using Equation (1).

The checksum KV block 202' is generated automatically by the system 100 upon data creation or modification, and is stored with a flag (denoted a "checksum flag") indicating that the that the KV block 202' is for checksum storage, which makes the KV block 202' invisible to end-users, and ensures that only system processes can access and manage it.

As shown in FIG. 9 and with the example of applying the HetroGuard method to RocksDB 308, the checksum KV block 202' comprises a special key 204' (denoted "key$^+$") incorporating the checksum flag, an automatically generated unique number 312' (denoted SeqNum$_{Key'}$, or "checksum SeqNum"), a value type 208' having a specific value "TombStone", the data SeqNum 312 copied from the data KV block 202, the first checksum 316, and the second checksum 318.

In the checksum KV block 202' shown in FIG. 9, the checksum SeqNum 312' and the "TombStone" value type 208' are denoted a Tail$^+$322 following the key$^+$204', and the data SeqNum 312, the first checksum 316, and the second checksum 318 are denoted Value$^+$324 (that is, the value of key$^+$204').

The data KV block 202 and the checksum KV block 202' are then written to the KV database 200 grouped with other data and checksum KV blocks in the same cluster, in the format of KV$_1$ KV$_2$ KV$_3$ KV$_4$ ... K$^+$V'$_1$ K$^+$V'$_2$ K$^+$V'$_3$ K$^+$V'$_4$ ... (wherein "KV" represents the data KV block 202 in the cluster, and "K$^+$V'" represents the checksum KV block 202' in the cluster).

When old codebase (such as a checksum system or method without using the HetroGuard method) reads a KV block and detects the "TombStone" value type 208 or 208' thereof (generally identified as 208), the old codebase simply deletes the checksum KV block 202'. In other words, the old codebase will treat the checksum KV block 202' in the same way as treating the conventional "TombStone"-type KV blocks. Thus, the HetroGuard method provides backward compatibility.

On the other hand, when a system using the HetroGuard method reads a KV block, it checks the value type 208 and the checksum flag. If the value type 208 is "TombStone" and the checksum flag indicates checksum storage, the system considers the KV block as a checksum KV block and skips the deletion operation (and may use it for checksum validation); otherwise, the system considers the KV block as a conventional "TombStone"-type KV block and deletes it. FIG. 10 shows a pseudocode for this selective TombStone processing, wherein "KV_pair" represent the KV block.

FIG. 11 is a schematic diagram showing some details of the HetroGuard method, according to some embodiments of this disclosure.

In these embodiments, the HetroGuard method focuses on the unique features of cache, and arranges the KV blocks such that the validation data (for example, checksum or metadata) is stored in close proximity to the corresponding data pieces within the same memory page, which minimizes the distance between the key 204 and the corresponding key$^+$204', and minimizes the need for additional memory page retrievals from the cache, thereby achieving improved performance. In these embodiments, the HetroGuard method associates the data KV block 202 with the corresponding checksum KV block 202' via the combination of the key 204 and the data SeqNum 312 in the data KV block 202, and the combination of the key' 204' and the stored data SeqNum 312 in the checksum KV block 202'. Moreover, the key$^+$204' also comprises the checksum flag.

As shown in FIG. 11, the HetroGuard method generates the key$^+$204' by combining (such as concatenating) the flag 210 (such as a byte value one (1), that is, an unsigned byte one (\u0001)) to the key 204 of the data KV block 202, and using the combination thereof as the key$^+$204'. As the keys are sorted as strings, the key$^+$204' is closely adjacent or neighboring to the key 204. Accordingly, the checksum KV block 202' is closely adjacent or neighboring to the data KV block 202, thereby ensuring that the validation data (such as the checksum KV block 202') is adjacent to the corresponding data (such as the corresponding data KV block 202) within the same memory page.

Note that, as the symbol \u0001 is the smallest character following the NUL symbol ('\u0000', which is prohibited at the end of strings on many KV systems), it ensures that the keys and their associated checksum metadata are placed consecutively.

FIG. 12 shows an example of a checksum KV block 202'.

The inclusion of the key 204 and the data SeqNum 312 of the data KV block 202 in the checksum KV block 202' establishes the association between the data KV block 202 and the checksum KV block 202'. Moreover, the key$^+$204 allows one to determine, based on key 204 and key$^+$204', which KV block contains the checksum of the data KV block having the key 204 in the case of a repeated key created by a cluster (described in more detail later).

By storing the validation data (such as the checksum KV block 202') adjacent the corresponding data (such as the corresponding data KV block 202) within the same memory page, the HetroGuard method in some embodiments may also use a prefetching method that intelligently loads both data and its corresponding validation data into the cache. This anticipatory action ensures that validation checks can be performed without additional cache fetches.

Figure 13:
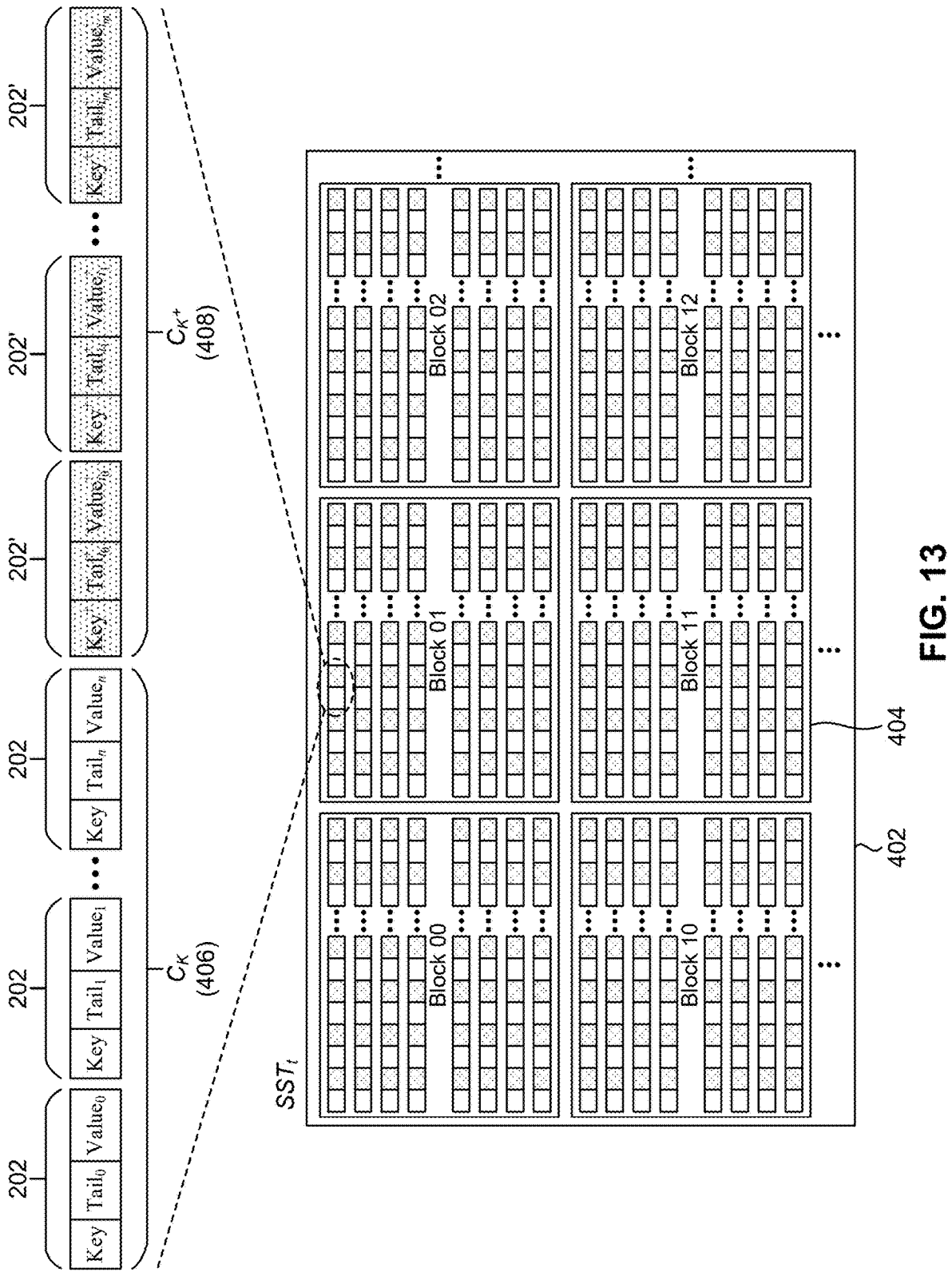
FIG. 13 is a schematic diagram showing clusters of a KV store and corresponding metadata.

In some embodiments, the keys and their corresponding checksums can generate two sequential clusters as shown in FIG. 13. As shown, the SST 402 comprises a plurality of SST blocks 404. Each SST block 404 comprises a plurality of data clusters 406 (also denoted "C$_K$") and a plurality of checksum clusters 408 (also denoted "C$_{K^+}$"). Each data cluster 406 comprises a plurality of data KV pairs 202 (that is, data KV blocks) having the same key K. Each checksum cluster 408 corresponds to a respective data cluster 406 and comprises a plurality of checksum KV pairs 202' (that is, checksum KV blocks) having the same marked key K$^+$ generated as described above (for example, a concatenation of the key K and \u0001). Each checksum KV pair 202' is associated with a data KV block 202 of the corresponding data cluster 406 via the marked key K$^+$ and the data SeqNum 312 as described above.

In other words, when multiple updates applied to the same key and these updates stored in the same memtable or SST file, a cluster of identical keys CKey (for example, $C_K$ 406 in FIG. 13) are formed. When the checksum KV blocks 202 (also denoted "K+V") is added to the memtable for all KV records, the checksum KV blocks 202 that share the duplicate key K+ form a cluster CKey+ (for example, $C_{K^+}$ 408 in FIG. 13) immediately following the cluster CKey. In such cases, it is necessary to determine which checksum key corresponds to each original key. This is achieved by including the sequence number 312 of the data KV block 202, which is a unique number, in the initial part of the checksum payload Value+ 324 (see FIG. 9).

Those skilled in the art will appreciate that the sequence of keys in CKey may not directly correspond to the sequence of keys in CKey+. This is because some keys are deleted or filtered, but their metadata is in the SST (denoted "orphan metadata"). There might also be some keys that do not have any corresponding metadata (originally created from nodes without using the HetroGuard method).

Thus, in some embodiments, the HetroGuard method uses a single-pass algorithm for cluster analysis to correspond the data KV blocks with their metadata KV blocks (such as their checksum KV blocks; described in more detail later). In some embodiments, the HetroGuard method also removes orphan metadata to enhance storage efficiency since the associated keys for these metadata have already been deleted.

As described above, the HetroGuard method in some embodiments put the metadata entry (such as checksum KV block 202') in the vicinity of the actual entries (that is, the data KV blocks 202) by appending the specific character (such as \u0001). However, this does not guarantee that data KV blocks 202 and their corresponding checksum KV blocks 202' are written in the same SST block to be efficiently retrieved in memory by reading one SST block file. For example, RocksDB determines the maximum size of the block as a constant and dumps entries into the block files in the compaction process whenever it reaches this capacity. This process may separate some entries with their corresponding metadata.

In some embodiments, the HetroGuard method may use a cache-optimized metadata retrieval method to ensure that the data KV blocks 202 and their corresponding checksum KV blocks 202' flush in the same block file during the compaction process. Therefore, reaching the metadata of an entry does not require reading two block files.

A significant benefit of the HetroGuard method is to achieve data integrity in a heterogeneous cluster. In some embodiments, each node may run a distinct version of the RocksDB code. Hence, it is vital to make sure that nodes without checksum metadata support are unable to detect it. It is important that the checksum metadata stays hidden, guaranteeing that (i) key iteration skips the checksum metadata, and (ii) automatic cleanup happens when SST files from a KV database (such as RocksDB) that implements the HetroGuard method are transferred to an older version of the KV database.

As described above, in some embodiments the specific value type 208' of "Tombstone" may be used to skip and auto-clean metadata. LSM-based KV stores, such as RocksDB, frequently employ a particular Tombstone value-type for key deletion. This type ensures that the keys marked therewith are automatically purged from the lower SST levels, and their iterator bypasses these keys. Hence, by using Tombstone, the HetroGuard method disclosed herein fulfills the two objectives in the diverse cluster on the RocksDB nodes that do not include the HetroGuard method. It is important to note that a new value type may not be introduced to RocksDB because it would not be recognized by older versions of RocksDB. The HetroGuard method uses the following criteria to identify a checksum metadata entry:

$$\text{is\_metadata}=\text{key};\text{endsWith}("\backslash 0001")\char`\^\text{key.type}==\text{TomeStone} \qquad (3)$$

where the KV block is a checksum metadata entry if is_metadata returns TRUE, or is not a checksum metadata entry if is metadata returns FALSE, key.endsWith("\0001") is a function checking if the key 204 or 204' ends with the symbol \u0001, "$\char`\^$" represents the logic- and operation, key.type refers to the value type 208 or 208', and "$==$" represents the comparison operation.

The HetroGuard method disclosed herein enables data integrity check during compaction.

Using RocksDB as an example, RocksDB is a write-intensive application designed for rapid data ingestion. To ensure consistency, it periodically performs a compaction process, selecting data from both memory and disk to create a new sorted structure. This process is prone to errors, as numerous KV reads and writes from memory and storage occur during this process. In this process, the HetroGuard method in some embodiments first checks the integrity of the data using the checksum metadata and then the Hetro-Guard method uses a repair mechanism for erroneous data.

In some embodiments, the HetroGuard method utilizes a single-pass approach for error detection. For each key within cluster CKey 406 and its associated metadata cluster CKey+ 408, the HetroGuard method first traverses the cluster CKey 406, computes their checksums, and stores them in a temporary map data structure using the key sequence number 312 of the KV block 202. Subsequently, the HetroGuard method uses the sequence number 312 stored in Value+ 324 of each K+V 202' in CKey+ 408 to retrieve the corresponding key from the map.

Next, the HetroGuard method initiates the verification process for the key and its associated checksum.

Initially, if the checksum of the KV block 202 calculated above (denoted the "CurrentChecksum") matches the first checksum 316 stored in K+V 202', the verification process returns Validated to indicate the correctness of the KV 202. If not, the verification process checks the data in K+V 202' by computing the checksum of the stored first checksum 316 and comparing it with the stored second checksum 318. A match implies that the KV 202 is erroneous, which prompts the verification process to return Corrupted. If there is no match, the verification process recalculates the checksum of the CurrentChecksum and compares it with the second checksum 318 stored in K+V 202'. If they are equal, it indicates that K+V 202' is incorrect. Hence, the verification process prevents the need to retrieve KV 202, which is generally quite large, and K+V 202' can be recalculated using a function CreateChecksum(•), returning a verdict Validated for the KV 202. Finally, if all comparisons fail, it indicates that both the K+V 202' and the KV 202 are erroneous, and the verification process returns Corrupted.

Figure 14:
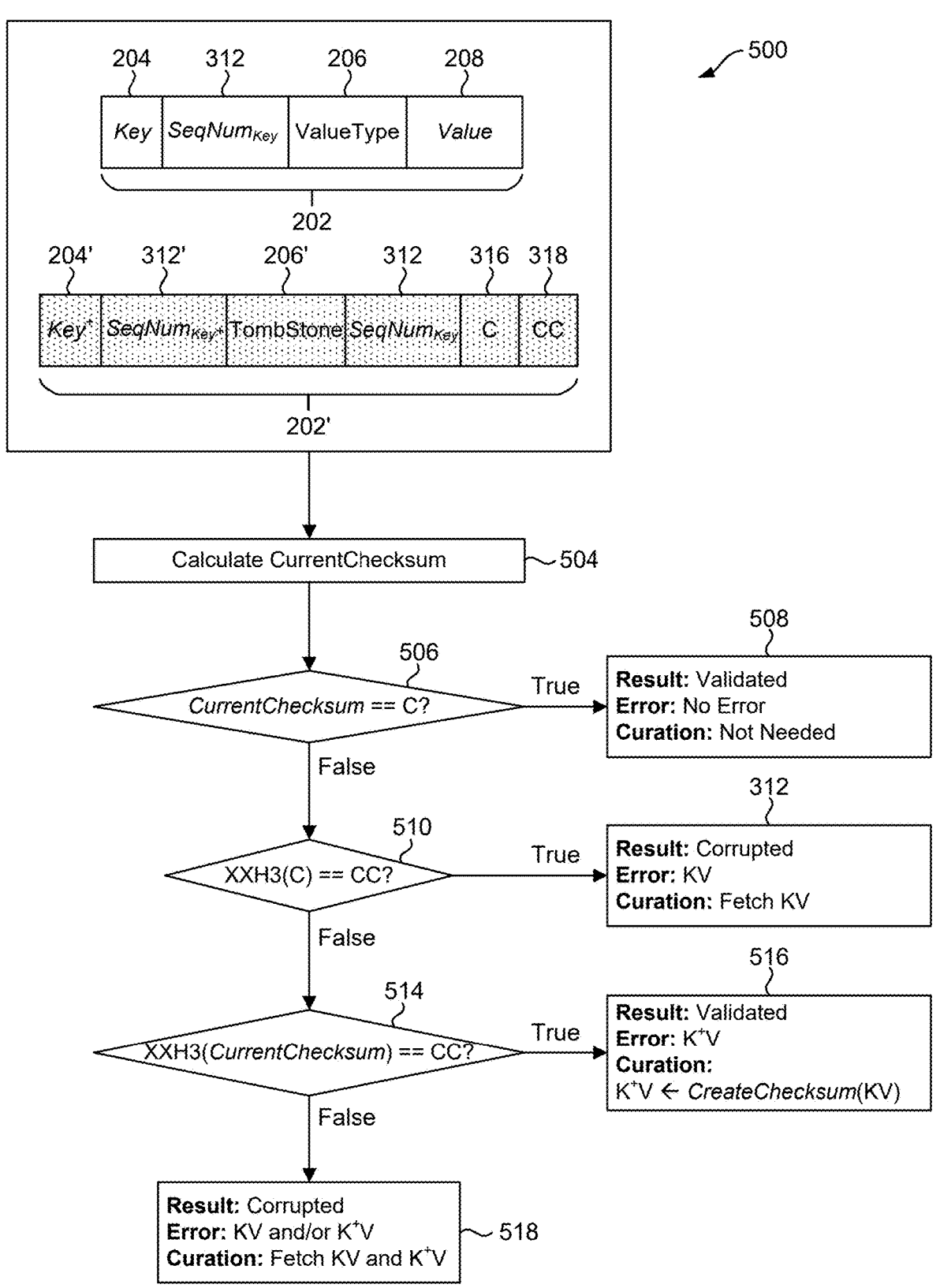
FIG. 14 is a flowchart showing an example of a verification process (which is also an error detection process) for verifying or validating, for example, the data KV block shown in FIG. 9, according to some embodiments of this disclosure.

FIG. 14 is a flowchart showing an example of the verification process 500 (which is also an error detection process) for verifying or validating, for example, the data KV block 202 shown in FIG. 9, according to some embodiments of this disclosure.

For each data KV block 202 and the associated checksum KV blocks 202' (are shown in box 304), at step 504, the verification process 500 calculates the CurrentChecksum of the data KV block 202, for example, as:

$$\text{CurrentChecksum}=\text{XOR}(XXH3(K), XXH3(\text{Se-qNum}_{Key}), XXH3(\text{ValueType}), XXH3(\text{Value})) \qquad (4)$$

where K is the key 204 of the data KV block 202, SeqNum$_{Key}$ is the sequence number 312 of the data KV block 202, ValueType is the value type 208 of the data KV block 202, and Value is the data piece 206 of the data KV block 202.

At step 306, the system 100 then checks if the generated CurrentChecksum equals to the first checksum C (316) in the checksum KV block 202', that is, calculating:

$$\text{CurrentChecksum} == C \qquad (5)$$

If CurrentChecksum equals to the first checksum C (that is, if the calculation CurrentChecksum==C is TRUE), the data piece 206 of the data KV block 202 is validated (that is, no error) and no fetch of the data KV block 202 is required (step 508).

If, at step 506, the calculated CurrentChecksum does not equal to the first checksum C (that is, if the calculation CurrentChecksum==C is FALSE), then, at step 510, the system 100 further checks if the checksum of the calculated CurrentChecksum equals to the second checksum CC (318) in the checksum KV block 202', for example, by calculating:

$$XXH3(\text{CurrentChecksum}) == CC \qquad (6)$$

If the checksum of the CurrentChecksum equals to the second checksum CC in the checksum KV block 202' (that is, the calculation XXH3(CurrentChecksum)==CC is TRUE), the data KV block 202 is corrupted and the system fetches the data KV block 202 (step 512).

If, at step 510, the checksum C in the checksum KV block 202' does equal to the second checksum CC in the checksum KV block 202' (that is, the calculation XXH3(CurrentChecksum)==CC is FALSE), then, at step 514, the system 100 generates the checksum C" of the CurrentChecksum calculated at step 504, for example, by calculating:

$$C'' = XXH3(\text{CurrentChecksum}) \qquad (7)$$

and checks if C" equals to the second checksum CC, that is, calculating:

$$C'' == CC \qquad (8)$$

If C" equals to the second checksum CC, the checksum KV block 202' (denoted "K⁺V block in FIG. 14) is corrupted and the system creates the first and second checksums C and CC by using a suitable function such as CreateChecksum (KV) (strep 516). The system 100 does not need to fetch the data KV block 202 at step 516.

If, at step 514, C" does not equal to the second checksum CC, then, the data KV block 202, the checksum KV block 202', or both are corrupted, and the system 100 fetches both the data KV block 202 and the checksum KV block 202' (step 518).

Those skilled in the art will appreciate that the calculations (7) and (8) may prevent one extra fetch for data. Not that if the second checksum CC (which is a checksum-of-checksum) is not used, fetching both the data KV block 202 and the checksum KV block 202' would be required after the FALSE result of step 510.

The validation procedure 500 provides additional functionalities for enhancing the accuracy of issue detection in a KV database, such as any one of or a combination of the following functionalities:

Granular issue detection:

The validation procedure 500 can act as a diagnostic module for analyzing data and identifying issues at the SST level 402 and the SST-Block level 404 (which is a specific segment of data within the KV database 200 that contains both the data KV block 202 and its associated checksum KV block 202'). This granularity allows the system to pinpoint whether discrepancies originate from the data KV block 202 or the checksum KV block 202', thereby enabling precise remediation efforts.

Resource-Efficient Decision Process:

The validation procedure 300 incorporates a decision-making algorithm that assesses the severity and nature of the detected issue to identify the minimum set of resources required to identify and resolve an issue (which may include, for example, the retrieval of specific KV blocks or associated data structures), thereby minimizing the number of the data fetches and optimizing the use of system resources.

By minimizing resource utilization, the system 100 ensures that performance overhead is kept to a minimum while maintaining high accuracy in issue detection.

Naïve Re-fetching Solution:

By using the validation procedure 300, the system 100 implements a naïve solution where it re-fetches the data from the data storage upon detecting a potential issue. This serves as a baseline method for ensuring data integrity, and preventing errors in the early stage of the system creation.

Figure 15:
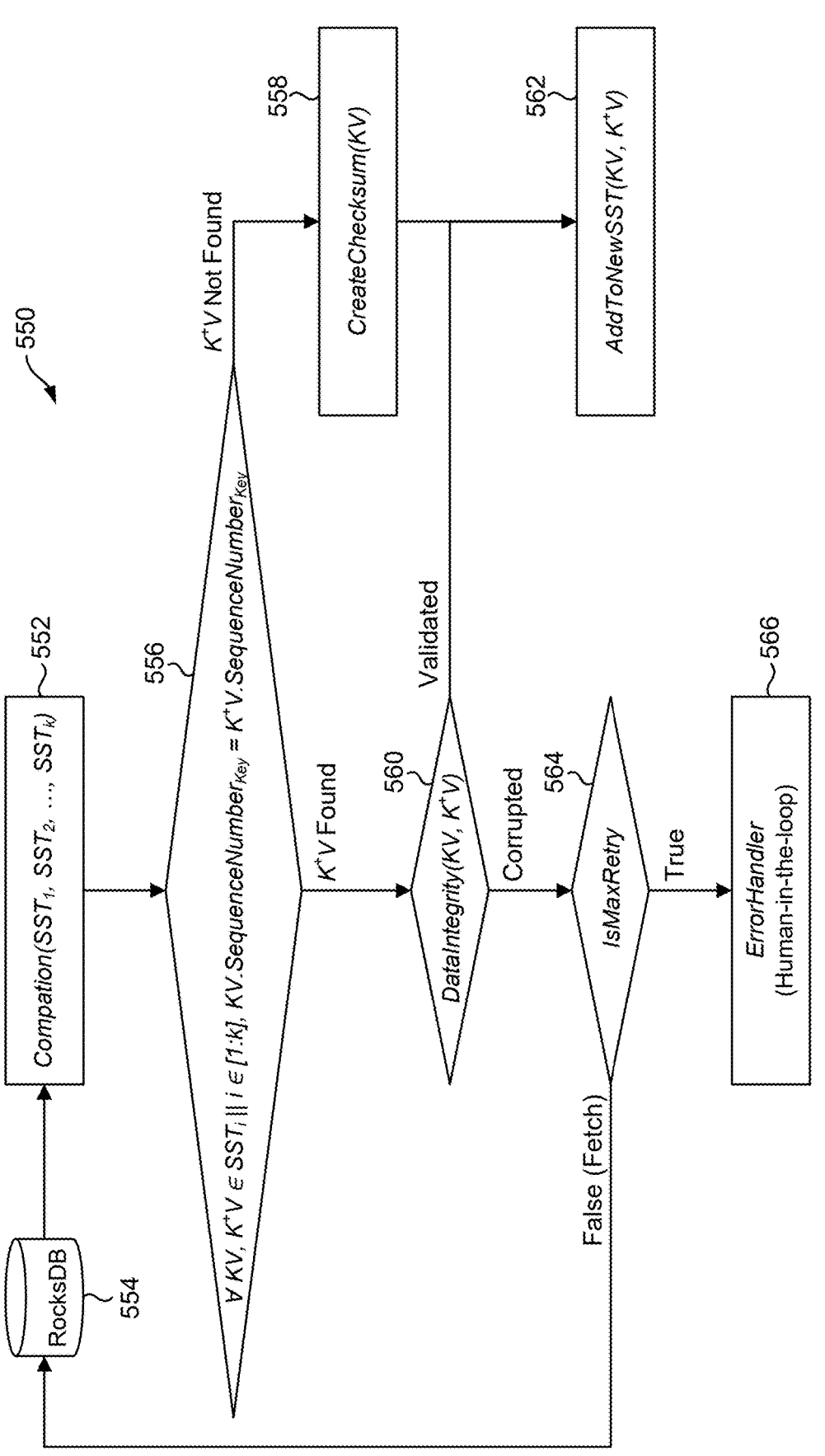
FIG. 15 is a flowchart showing an example of a data repair process, according to some embodiments of this disclosure.

In some embodiments, the HetroGuard method uses the above-described error detection as a subprocess to identify erroneous data during the compaction process. If erroneous data is identified, the HetroGuard method may try to repair the erroneous data. FIG. 15 is a flowchart showing an example of the repair process 550.

As shown, for every KV (that is, every data KV block 202) in the SST 402 undergoing compaction (box 552), the HetroGuard method finds the associated K⁺V (that is, the associated checksum KV block 202'), for example, by comparing the data SeqNum 312 (that is, SeqNum$_{Key}$, or SequenceNumber$_{Key}$) 312 (step 556):

$$\forall \ KV, \ K^+V \in SST_i \backslash\backslash i \in [1:k],$$
$$KV.\text{SequenceNumber}_{Key} = K^+V.\text{SequenceNumber}_{Key}.$$

If the associated K⁺V is not found, the HetroGuard method generates a K⁺V 202' for the KV block 202 (step 558) using a function CreateChecksum(KV) (for example, following the process shown in FIG. 9), and adds the KV 202 and K⁺V 202' to the new SST (step 562), for example, by using a function AddToNewSST(KV, K⁺V).

If the associated K⁺V is found at step 556, the HetroGuard method checks the data integrity of the KV 202 and the associated K⁺V 202' (step 560), for example, by using a function DataIntegrity(KV, K⁺V) following the error detection process 500 shown in FIG. 14.

If the data is validated, the KV 202 and the associated K⁺V 202' are added to the new SST (step 562), for example, by using the function AddToNewSST(KV, K⁺V). Then, no further action is required.

If it is determined that the data is corrupted at step 560, a maximum retry counter is set (step 564), and the HetroGuard method retrieves the data specified by the error detection process 500 from the RocksDB 554.

If the error persists after the maximum number of retries, an error handler process is activated (step 566) for deeper investigation, which may involve human-in-the-loop, that is, bringing in domain experts for further analysis. Given the heterogeneity of the nodes cluster, there is no requirement to locate K⁺V 202'.

Evaluations have been conducted to prove the effectiveness in meeting the three metadata management objectives (that is, the performance, heterogeneity, and privacy objectives described above) for a heterogeneous cloud cluster.

In the evaluations, the HetroGuard method is implemented in RocksDB version 8.1.1 running on an Ubuntu 20.04 Linux machine with AMD Ryzen ThreadRipper Pro 5995WX 64-core 2.7 GHz CPU and 256 GB DDR4 RAM. With respect to the dataset and workloads, the evaluations utilize the "Yahoo!Cloud Serving Benchmark" (YCSB) to produce key-value pairs and simulate workloads. The key and value sizes are configured to 20 and 100 bytes, respectively. The evaluations are conducted on the following YCSB workloads using a zipfian distribution: (1) Read-Only with no PUT operations, (2) Read-Heavy with 5% PUT operations, and (3) Update-Heavy with 50% PUT operations. Each workload is executed for 2 million operations.

Table 1 shows the performance results of different workload executions on RocksDB with and without the Hetro-Guard method. The RocksDB with the HetroGuard method includes the insertion of checksum metadata and the execution of the error detection algorithm. The Evaluations exclude 1% of outlier data and utilize the median times of PUT and GET operations to measure performance.

The HetroGuard method incurs minimal memory overhead during the compaction process, which is influenced by the length of the keys within a cluster. By precalculating the checksum of each key and storing it in the map using its sequence number as the map's key, the memory overhead is 16 bytes per key in the cluster. Consequently, even with a cluster containing 1000 keys, the overhead remains under 2 kilobytes (KB).

With respect to error detection in heterogeneous KV cluster, to evaluate the heterogeneity feature of the Hetro-Guard method, an experiment is used in the evaluations which involves three RocksDB key-value nodes and one load-balancer node which distribute the data between the RocksDB shards based on the key prefixes. The HetroGuard method is added to one of the nodes, while two other KV nodes have the lower software version without the Hetro-Guard method. A fault injection code is also embedded into the HetroGuard method that modifies one bit of the checksum payload with a chance 1%. Different prefixes are also periodically assigned to each shard to migrate the data between shards.

TABLE 1

COMPARISON OF PERFORMANCE RESULTS OF ROCKSDB WITH AND WITHOUT HETROGUARD

| Workload | PUT Operation (Nanosecond) | | | GET Operation (Nanosecond) | | |
|---|---|---|---|---|---|---|
| | RocksDB | HetroGuard | Difference (%) | RocksDB | HetroGuard | Difference (%) |
| Read-Only (0% write rate) | — | — | — | 172124 | 172829 | 0.41% |
| Read-Heavy (5% write rate) | 83530 | 84001 | 0.56% | 163417 | 164021 | 0.37% |
| Update-Heavy (50% write rate) | 100184 | 100931 | 0.74% | 159856 | 160543 | 0.43% |

As can be seen, the HetroGuard method has a negligible impact on GET operations with less than 0.5%. This is because the HetroGuard method does not generate K⁺V 202', and therefore, fetching a key-value does not have the overhead of getting the metadata payload. The same experiments have been conducted by adding metadata to the value payload. In this case, a slower throughput of more than 10% has been observed through all three workloads.

The HetroGuard method also has less than 0.8% impact on PUT operations. In the evaluations, the addition of checksum metadata is migrated to when the SST is created from the immutable memtables (see FIG. 7). This ensures that the HetroGuard method does not need to locate the correct position of the keys for any new entries in the current memtable. Writing the immutable memtable to new SST files occurs as a background process, which minimally affects users' PUT operations. Also, as the keys are flushed in a sorted manner and the checksum metadata is always placed after the keys, there is no overhead for looking up the metadata place.

Overhead analysis is also conducted in the evaluations. The storage overhead involved in the HetroGuard method is as follows: (1) the key length plus one special character to put the metadata right after the key in the SST files, and (2) eight bytes for the sequence number to find the corresponding entry in the metadata in clusters. The rest are the payloads that we need to put in the metadata. In the data integrity scenario used in the evaluations, eight bytes of checksum and eight bytes of payload checksum are added to the metadata payload to check the data correctness.

This experiment shows that data from the old nodes got metadata when they migrated to the HetroGuard node, and no metadata was transferred to the old nodes. Even when migrating a full SST from HetroGuard to the old nodes, metadata was removed automatically without users' notice since they have Tombstone type. In addition, It is observed that faulty data is detected before sending it to the new node for the first time it is undergoing compaction.

In some embodiments, the validation procedure 300 may use an adaptive resolution method that learns from past discrepancies to improve the precision and efficiency of future issue detection and resolution.

Those skilled in the art will appreciate that other embodiments are readily available. For example, the association between the KV block 202 and the corresponding checksum KV block 202' may be established using any other suitable methods such as storing a pointer of one of the KV blocks 202 and 202' in the other one thereof, and/or the like.

In above embodiments, the checksum flag 210 is represented by the symbol "\u0001" in the key⁺204' of the checksum KV block 202' (appended to the key 204 of the data KV block 202 in the key⁺204'). In other embodiments, the checksum flag may be established using any other suitable methods, for example, by including a specific checksum flag field in the checksum KV block 202'.

Figure 16:
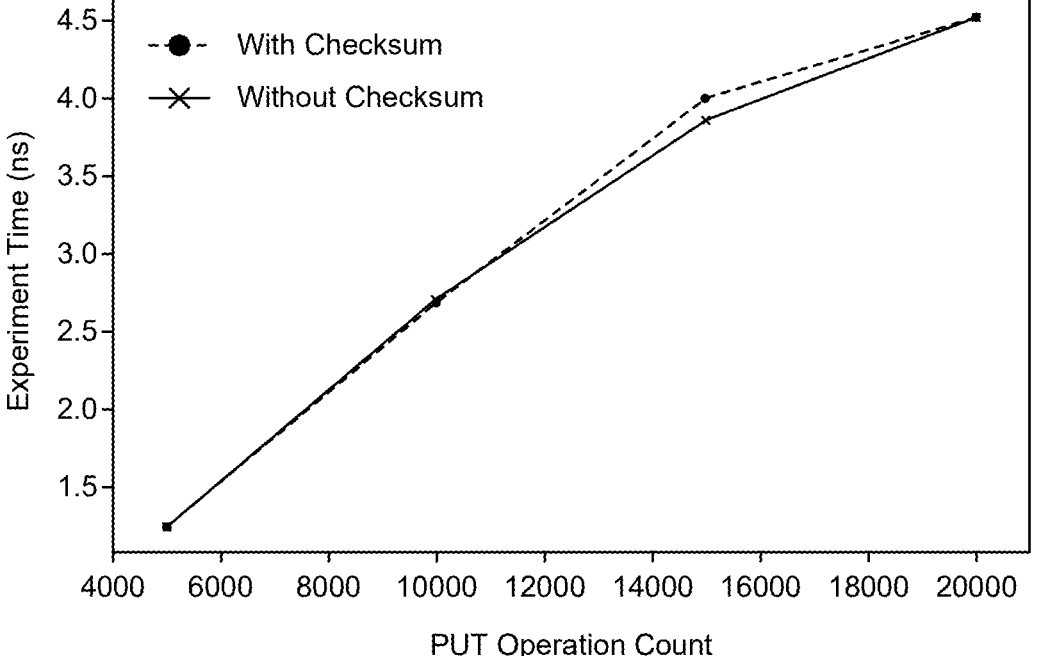
FIG. 16 is a plot showing evaluation results of PUT operations with and without the HetroGuard method.

In some embodiments, the HetroGuard method disclosed herein may pass some or all of its computations into background process so it has no impact on end users experience, thereby achieving high performance workload. This is shown in FIG. 16 for PUT operations. Similar observation is also made for GET operations.

Table 2 below shows the comparison of prior-art methods and the HetroGuard method disclosed herein.

TABLE 2

COMPARISON OF PRIOR-ART METHODS AND THE
HETROGUARD METHOD

| Method | Backward-Compat-ibility | Forward-Compat-ibility | Cache-Opti-mized | Hetero-geneous | Accu-racy | Storage-Opti-mized |
|---|---|---|---|---|---|---|
| Payload | √ | × | √ | × | √ | × |
| Metadata per key | √ | √ | × | × | √ | × |
| Block-based | √ | √ | × | × | × | × |
| HetroGuard | √ | √ | √ | √ | √ | √ |

Figure 17:
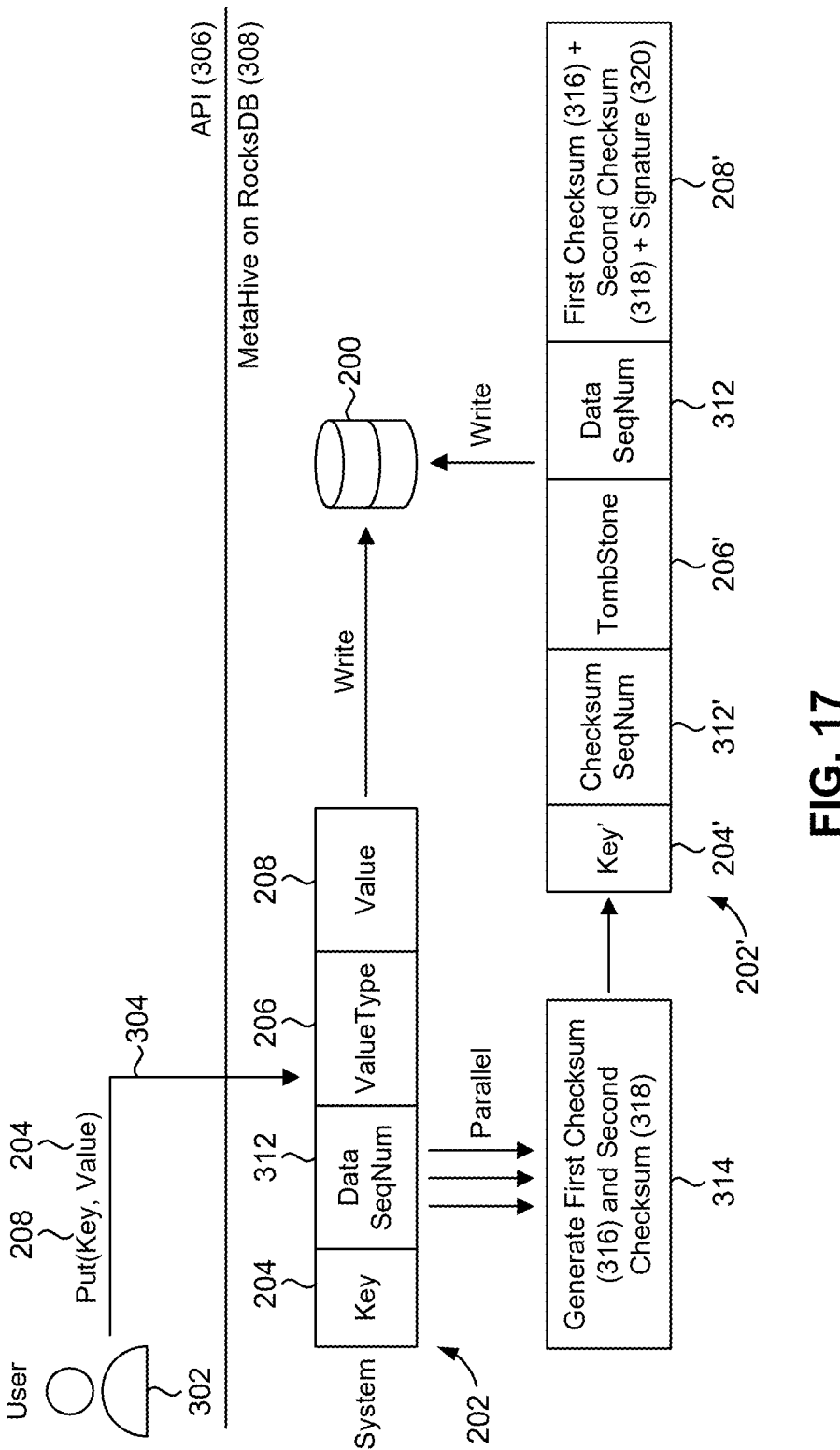
FIG. 17 is a schematic diagram showing another example of the HetroGuard method, according to some embodiments of this disclosure.

In some embodiments as shown in FIG. 17, the checksum KV block 202' may comprise the first checksum 316, the second checksum 318, and a signature 320 calculated by, for example, bitwise XOR between the first checksum 316 and the second checksum 318.

In some embodiments, the checksum of a data KV block 202 may be calculated based on the value 206 only.

In some embodiments, the HetroGuard method provides version control function for checksums, allowing different versions of the application to understand and correctly handle various checksum formats.

In some embodiments, the HetroGuard method may be adapted for distributed databases, where checksum consistency is maintained across multiple nodes, ensuring data integrity in a distributed environment.

In above embodiments, RocksDB is used as an example for describing the HetroGuard method. Those skilled in the art will appreciate that, in various embodiments, the HetroGuard method may be similarly used in other environments and/or other KV databases that have defined specific value types for omitting the KV blocks (which generally rendering the data piece in those KV blocks unretrievable). More specifically, a checksum KV block may be indicated by a checksum flag as described above, and may be marked with the specific value types for omission so as to provide backward compatibility.

Generally, the HetroGuard method can be integrated into existing KV databases without extensive modifications. It leverages the existing architecture's handling of KV pairs and specific value types for omission, augmenting it with additional logic for checksum management.

This compatibility allows for seamless updates to the software, without the need for significant refactoring or data migration.

Thus, the HetroGuard method allows for a broader impact across various industries. The flexibility of the solution and the enhancements that the HetroGuard method may provide indicate the HetroGuard method's adaptability and long-term viability in various industries.

While in above embodiments, the HetroGuard method is described for carrying out the error detection problem, in some other embodiments, the HetroGuard method may be used to store any meta data in vicinity of the original data. The above-described method to entangle data with key to metadata with key+ can be extended to other metadata in addition of checksum.

In above description, various embodiments of the HetroGuard method are described. In some embodiments, the HetroGuard method uses checksum as system-generated metadata, such that checksums are treated as a special type of system-generated KV data. Unlike conventional user-generated KV pairs, these system-generated metadata entries are invisible to end-users and are not accessible through standard query interfaces.

In KV databases such as RocksDB, "Tombstone" markers are used to indicate data that should be deleted. In some embodiments, the HetroGuard method uses selective tombstone flags for distinguishing KV checksum data from actual Tombstone markers, thereby preventing the deletion of important checksum information by new versions of the codebase, and thus providing a mechanism for the checksum to be recognized and processed by both legacy and updated systems, ensuring compatibility across different versions of the software that interact with the database.

In some embodiments, the HetroGuard method ensures memory-page-localized key-value pairs by structuring KV pairs in such a way (for example, by appending byte value 1 (\u0001) at the end of the key string) that the validation data (for example, checksum or metadata) is stored in close proximity or neighboring to the actual data within the same memory page. This proximity minimizes the need for additional memory page retrievals from the cache and reduces the latency associated with cache page calls since related data is accessed in a single operation. Herein, the term "ensure" means that the "ensured" result will occur with a large probability, and does not necessarily mean that the "ensured" result would always occur.

In some embodiments, the HetroGuard method the KV pairs are organized such that commonly accessed and validated data are grouped together, exploiting the principle of locality for cache efficiency.

In some embodiments, the HetroGuard method uses a cache-optimized data layout method to strategically place data and its associated validation components on the same memory page. This optimization is designed to exploit spatial locality, which is beneficial for cache performance.

In some embodiments, the data layout method is fine-tuned to arrange data within memory pages such that cache utilization is maximized. This layout considers the access patterns and validation frequency of the data.

In some embodiments, the data layout method ensures that the cache lines loaded into the CPU cache are used to their full potential, thereby reducing the need for cache replacements and thereby maintaining high cache performance.

In some embodiments, the HetroGuard method uses an intelligent prefetching mechanism that anticipates the need for validation data when accessing main data, ensuring that both are loaded into the cache simultaneously.

In some embodiments, the HetroGuard method uses dynamic data reallocation to ensure that frequently validated KV pairs remain on the same memory page, thereby reducing cache misses and enhancing performance.

Although in above embodiments, a byte value one (1) is used for appending to the key 204 of a data KV block 202 for generating the $K^+$282 of the checksum KV block 202' to make the checksum KV block 202' closely adjacent or neighboring to the data KV block 202, in some other embodiments, other suitable values may be used for appending to the key 204 of a data KV block 202 for generating the $key^+$204' of the checksum KV block 202' to make the checksum KV block 202' closely adjacent or neighboring to the data KV block 202.

Although in above embodiments, the HetroGuard method is described for use with a KV database, in various embodiments, the HetroGuard method may be used for managing (such as reading, writing, storing, and/or the like) a storage storing one or more KV blocks.

In various embodiments, the HetroGuard method may be used for managing any metadata type in key-value stores.

With the features and benefits of the HetroGuard method described above, those skilled in the art will appreciate that the HetroGuard method disclosed herein has various advantages such as:

by using a specific type key-value for checksum metadata, the HetroGuard method disclosed herein provides backward- and forward-compatibility and ability of automatically cleaning checksums by old codebase;

by using a specific mark (such as byte value 1 (\u0001)) in the key (that is, key$^+$) of the checksum KV block 202', the HetroGuard method disclosed herein provides cache-optimized, efficient processing of KV blocks, thereby providing improved performance;

the HetroGuard method disclosed herein provides accurate error detection, minimum data pull, and right-to-the-point error detector.

In some embodiments, the methods disclosed herein may be implemented as computer-executable instructions stored in one or more non-transitory computer-readable storage devices (in the form of software, firmware, or a combination thereof) such that, the instructions, when executed, may cause one or more physical components such as one or more circuits to perform the methods disclosed herein.

For example, in some embodiments, an apparatus comprising one or more processors functionally connected to one or more non-transitory computer-readable storage devices or media may be used to perform the methods disclosed herein, wherein the one or more non-transitory computer-readable storage devices or media store the computer-executable instructions of the methods disclosed herein, and the one or more processors may read the computer-executable instructions from the one or more non-transitory computer-readable storage devices or media, and executes the instructions to perform the methods disclosed herein.

In some embodiments, an apparatus may not have any processors or computer-readable storage devices or media. Rather, the apparatus may comprise any other suitable physical or virtual (explained below) components for implementing the methods disclosed herein.

In some embodiments, the computer-executable instructions that implement the methods disclosed herein may be one or more computer programs, one or more program products, or a combination thereof.

In some embodiments, the methods disclosed herein may be implemented as one or more circuits, one or more components, one or more units, one or more modules, one or more integrated-circuit (IC) chips, one or more chipsets, one or more devices, one or more apparatuses, one or more systems, and/or the like.

The one or more circuits, one or more components, one or more units, one or more modules, one or more IC chips, one or more chipsets, one or more devices, one or more apparatuses, or one or more systems may be physical, virtual, or a combination thereof. Herein, the term "virtual" (such as a "virtual apparatus") refers to a circuit, component, unit, module, chipset, device, apparatus, system, or the like that is simulated or emulated or otherwise formed using suitable software or firmware such that it appears as if it is "real" or physical).

The present disclosure encompasses various embodiments, including not only method embodiments, but also other embodiments such as apparatus embodiments and embodiments related to non-transitory computer readable storage media. Embodiments may incorporate, individually or in combinations, the features disclosed herein.

Although this disclosure refers to illustrative embodiments, this is not intended to be construed in a limiting sense. Various modifications and combinations of the illustrative embodiments, as well as other embodiments of the disclosure, will be apparent to persons skilled in the art upon reference to the description.

Features disclosed herein in the context of any particular embodiments may also or instead be implemented in other embodiments. Method embodiments, for example, may also or instead be implemented in apparatus, system, and/or computer program product embodiments. In addition, although embodiments are described primarily in the context of methods and apparatus, other implementations are also contemplated, as instructions stored on one or more non-transitory computer-readable media, for example. Such media could store programming or instructions to perform any of various methods consistent with the present disclosure.

| C. ACRONYMS, ABBREVIATIONS, AND DEFINITION OF SOME TERMS | |
| --- | --- |
| Full Name | Acronym/ Abbreviation/ Initialism |
| Database | DB |
| Key-Value | KV |
| Key-V Database Checksum | KVDC |
| Error Detection | ED |
| KV-Level RocksDB Checksum | KVLC |
| Write-Ahead Log | WAL |
| Log-Structured Merge-tree | LSM-Tree |
| Memory Table | Memtable |
| Sorted String Table | SST |
| Sequence Number | SN |
| Key Cluster | CK |

Herein, a key-value (KV) database (also denoted "key-value store") is a data storage paradigm designed for storing, retrieving, and managing associative arrays, and a data structure more commonly known today as a dictionary or hash table. Dictionaries contain a collection of objects, or records, which in turn have many different fields therewithin, each containing data. These records are stored and retrieved using a key that uniquely identifies the record and may be used to find the data within the database.

Herein, error-detection (ER) systems are a type of systems that have measure that regarding to those measure find error inside data. The ground-truth data can store as data or pass as model. The ER systems can actively trace errors and signal error-handler systems.

Herein, a write-ahead log (WAL) is a log file created by RocksDB and in general a write-intensive data store to increase the writing performance, wherein the write-intensive data store writes data into the write-ahead log, and then a background process commits the data into the real database and solves any possible inconsistencies.

Herein, a Log-Structured Merge Tree (LSM-Tree) is a disk-based data structure that is widely used in storage systems and databases to efficiently handle high write workloads. LSM-Trees are optimized for write-intensive workloads while still providing efficient read operations.

Herein, a memtable is an in-memory data structure that acts as a write buffer. It stores recently written data in a sorted order based on the keys. Write operations are first appended to the memtable, which allows for efficient sequential writes in memory.

Once a memtable reaches a certain size or threshold, it is flushed to disk as a sorted string table (SST). Herein, a sorted string table or SST is an immutable, sorted table stored on disk. An SST is typically stored in multiple files, and each file represents a separate level in the LSM-Tree. The SST are optimized for sequential reads.

Herein, a manifest log is a file for tracking all log related to the integrity of file systems, WAL files, and SST files.

As new SSTs are created during flush operations, periodic compaction processes are performed to merge and reconcile overlapping data in the SSTs. Herein, a compaction process involves merging multiple SSTs into a new, compacted SST, eliminating duplicates, and creating a new level in the LSM-Tree. This process helps to minimize the number of disk reads during read operations.

Herein, the term "Backward Compatibility" refers to the situation wherein a node with new codebase (for example, the code added according to the HetroGuard method disclosed herein) obtains data generated from a node with old codebase (for example, the code without using the Hetro-Guard method disclosed herein).

Herein the term "forward compatibility" refers to the situation wherein a node with old codebase obtains data generated from a node with new codebase.

Herein, a memory block is a contiguous chunk of memory allocated for specific purposes in a computer system, managed by the operating system and used to store data or instructions. Block size, a critical parameter in file systems and databases, affects data access and storage efficiency.

A memory page is a contiguous block of virtual memory described by a single entry in the page table, typically sized in powers of two (for example, 4 kilobytes (KB) or 8 KB), and is crucial for memory management.

Herein, the term "cache optimality" refers to the degree to which an algorithm or data structure uses cache memory, with the aim of accessing data within the same memory page frequently to minimize page faults and improve performance. Designing with memory blocks and pages in mind can improve cache usage and system efficiency.

Herein, use of language such as "at least one of X, Y, and Z," "at least one of X, Y, or Z," "at least one or more of X, Y, and Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

Those skilled in the art will appreciate that the above-described embodiments and/or features thereof may be customized, separated, and/or combined as needed or desired. Moreover, although embodiments have been described above with reference to the accompanying drawings, those of skill in the art will appreciate that variations and modifications may be made without departing from the scope thereof as defined by the appended claims.

The invention claimed is:

1. An apparatus comprising:
a memory storing computer-executable instructions; and
one or more processors;
wherein the instructions, when executed, cause the one or more processors to perform actions comprising:

receiving a first piece of data;
storing the first piece of data and a corresponding first key into a key-value (KV) storage as a first KV block;
generating a first metadata for at least the first piece of data; and
storing a second key, the first metadata, and a first indication into the KV storage as a second KV block, the second KV block being associated with the first KV block;
wherein the first indication is for causing the first metadata of the second KB block to be retrievable by a first method and to be unretrievable by a second method capable of retrieving data from KV blocks without the first indication.

2. The apparatus of claim 1, wherein the KV storage is a KV database.

3. The apparatus of claim 1, wherein the first metadata is a first checksum of at least the first piece of data.

4. The apparatus of claim 3, wherein the second KV block further comprises a second checksum of the first checksum.

5. The apparatus of claim 1, wherein the first metadata is a first checksum generated from a combination of the first key, the first piece of data, a unique number of the first KV block, and a value type of the first KV block.

6. The apparatus of claim 1, wherein the first indication is a data type for indicating the second method to delete any KV block having this value type.

7. The apparatus of claim 1, wherein the second key is generated from the first key marked by a second indication.

8. The apparatus of claim 7, wherein the second indication is for causing the second key to be adjacent the first key in a sorting of a plurality of items including the first key and the second key.

9. The apparatus of claim 7, wherein the second indication is an unsigned byte value one appending to the first key for generating the second key.

10. The apparatus of claim 1, wherein the second key comprises a unique number of the first KV block.

11. The apparatus of claim 1, wherein the first metadata is a first checksum of at least the first piece of data;
wherein the second KV block further comprises a second checksum of the first checksum; and
wherein the instructions, when executed, cause the one or more processors to perform further actions comprising:
reading the first KV block and the second KV block from the KV storage as a third KV block and a fourth KV block, respectively, the third KV block comprising a second piece of data corresponding to the first piece of data of the first KV block, and the fourth KV block comprising a third checksum and a fourth checksum,
comparing a fifth checksum of at least the second piece of data with the third checksum,
if the fifth checksum does not equal to the third checksum, comparing a sixth checksum of the third checksum with the fourth checksum,
if the sixth checksum equals to the fourth checksum, reading the first KV block from the KV storage as the third KV block,
if the sixth checksum does not equal to the fourth checksum, comparing a seventh checksum of the fifth checksum with the fourth checksum, and
if the seventh checksum does not equal to the fourth checksum, reading the first KV block and the second KV block from the KV storage as the third KV block and the fourth KV block, respectively.

12. A computerized method comprising:

receiving a first piece of data;

storing the first piece of data and a corresponding first key into a key-value (KV) storage as a first KV block;

generating a first metadata for at least the first piece of data; and storing a second key, the first metadata, and a first indication into the KV storage as a second KV block, the second KV block being associated with the first KV block;

wherein the first indication is for causing the first metadata of the second KB block to be retrievable by a first method and to be unretrievable by a second method capable of retrieving data from KV blocks without the first indication.

13. The computerized method of claim 12, wherein the first indication is a value type for indicating the second method to delete any KV block having this value type.

14. The computerized method of claim 13, wherein the second key is generated by appending an unsigned byte value to the first key for causing the second key to be adjacent the first key in a sorting of a plurality of items including the first key and the second key.

15. The computerized method of claim 13, wherein the first metadata is a first checksum of at least the first piece of data;

wherein the second KV block further comprises a second checksum of the first checksum; and wherein the computerized method further comprises:

reading the first KV block and the second KV block from the KV storage as a third KV block and a fourth KV block, respectively, the third KV block comprising a second piece of data corresponding to the first piece of data of the first KV block, and the fourth KV block comprising a third checksum and a fourth checksum, comparing a fifth checksum of at least the second piece of data with the third checksum, if the fifth checksum does not equal to the third checksum, comparing a sixth checksum of the third checksum with the fourth checksum, if the sixth checksum equals to the fourth checksum, reading the first KV block from the KV storage as the third KV block, if the sixth checksum does not equal to the fourth checksum, comparing a seventh checksum of the fifth checksum with the fourth checksum, and if the seventh checksum does not equal to the fourth checksum, reading the first KV block and the second KV block from the KV storage as the third KV block and the fourth KV block, respectively.

16. One or more non-transitory computer-readable storage media comprising computer-executable instructions, wherein the instructions, when executed, cause one or more processors to perform actions comprising:

receiving a first piece of data;

storing the first piece of data and a corresponding first key into a key-value (KV) database as a first KV block;

generating a first checksum of at least the first piece of data; and storing a second key, the first metadata, and a first indication into the KV storage as a second KV block, the second KV block being associated with the first KV block;

wherein the first indication is for causing the first metadata of the second KB block to be retrievable by a first method and to be unretrievable by a second method capable of retrieving data from KV blocks without the first indication.

17. The one or more non-transitory computer-readable storage media of claim 16, wherein the first indication is a value type for indicating the second method to delete any KV block having this value type.

18. The one or more non-transitory computer-readable storage media of claim 16, wherein the second key is generated by appending an unsigned byte value to the first key for causing the second key to be adjacent the first key in a sorting of a plurality of items including the first key and the second key.

19. The one or more non-transitory computer-readable storage media of claim 18, wherein the unsigned byte value is an unsigned byte value one.

20. The one or more non-transitory computer-readable storage media of claim 16, wherein the first metadata is a first checksum of at least the first piece of data;

wherein the second KV block further comprises a second checksum of the first checksum; and wherein the method further comprises:

reading the first KV block and the second KV block from the KV storage as a third KV block and a fourth KV block, respectively, the third KV block comprising a second piece of data corresponding to the first piece of data of the first KV block, and the fourth KV block comprising a third checksum and a fourth checksum, comparing a fifth checksum of at least the second piece of data with the third checksum, if the fifth checksum does not equal to the third checksum, comparing a sixth checksum of the third checksum with the fourth checksum, if the sixth checksum equals to the fourth checksum, reading the first KV block from the KV storage as the third KV block, if the sixth checksum does not equal to the fourth checksum, comparing a seventh checksum of the fifth checksum with the fourth checksum, and if the seventh checksum does not equal to the fourth checksum, reading the first KV block and the second KV block from the KV storage as the third KV block and the fourth KV block, respectively.

\* \* \* \* \*